US012634918B2

(12) United States Patent
Singh et al.

(10) Patent No.: US 12,634,918 B2
(45) Date of Patent: May 19, 2026

(54) RADIO ACCESS NETWORK RESOURCE GRANT ALLOCATION AND RELATED ASPECTS

(71) Applicant: Telefonaktiebolaget LM Ericsson (publ), Stockholm (SE)

(72) Inventors: Bikramjit Singh, Raasepori (FI); Min Wang, Luleå (SE); Jan Christoffersson, Luleå (SE); Mårten Ericson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 18/038,997

(22) PCT Filed: Dec. 1, 2020

(86) PCT No.: PCT/SE2020/051151
§ 371 (c)(1),
(2) Date: May 26, 2023

(87) PCT Pub. No.: WO2022/119483
PCT Pub. Date: Jun. 9, 2022

(65) Prior Publication Data
US 2023/0422235 A1 Dec. 28, 2023

(51) Int. Cl.
H04W 72/12 (2023.01)
H04L 1/1867 (2023.01)
H04W 72/23 (2023.01)

(52) U.S. Cl.
CPC .......... H04W 72/12 (2013.01); H04L 1/1896 (2013.01); H04W 72/23 (2023.01)

(58) Field of Classification Search
None
See application file for complete search history.

(56) References Cited

U.S. PATENT DOCUMENTS

2019/0132862 A1 5/2019 Jeon et al.
2020/0367268 A1 11/2020 Tijoriwala et al.
(Continued)

FOREIGN PATENT DOCUMENTS

EP 3402288 A1 11/2018
EP 20189950 * 8/2020
(Continued)

OTHER PUBLICATIONS

Author Unknown, Feedbacks for improving URLLC reliability, Doc. No. R1-1703123, pp. 1-4, Feb. 17, 2017.*
(Continued)

*Primary Examiner* — Christopher M Crutchfield
(74) *Attorney, Agent, or Firm* — Sage Patent Group

(57) ABSTRACT

Various ways for a network node in a radio access network to allocate a grant, "CG" of dedicated and/or shared radio resources to a wireless communications device are disclosed which disperse repetitive transmissions within a configured grant period. One disclosed example aspect includes a method performed by a network node in a radio access network, the network node being configured to grant radio resources to a plurality of wireless communications devices, the method including: obtaining signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and sending the signalling information to at least one of the plurality of wireless communication devices.

20 Claims, 13 Drawing Sheets

(56) References Cited

U.S. PATENT DOCUMENTS

| 2022/0038211 A1* | 2/2022 | Talarico | ............... H04W 72/23 |
|---|---|---|---|
| 2023/0156674 A1* | 5/2023 | Yao | ....................... H04W 16/14 |
| | | | 370/280 |
| 2023/0189308 A1* | 6/2023 | Choi | .................... H04W 72/51 |
| 2024/0298320 A1* | 9/2024 | Wong | ................. H04W 72/566 |

FOREIGN PATENT DOCUMENTS

| WO | 2019137116 A1 | 7/2019 |
|---|---|---|
| WO | 2020057755 A1 | 3/2020 |
| WO | 2020143911 A1 | 7/2020 |

OTHER PUBLICATIONS

Author Unknown, Review of TR 25.702 v12.0.0, Doc. No. R1-134552, pp. 1-28 Oct. 11, 2013.*
International Search Report and Written Opinion of the International Searching Authority, PCT/SE2020/051151, mailed Aug. 19, 2021, 12 pages.
Singh, Bikramjit et al., "Configured Grant for Semi-Deterministic Traffic for Ultra-Reliable and Low Latency Communications"; 6G Wireless Summit, poster paper, Sep. 10, 2020; 3 pages.

* cited by examiner

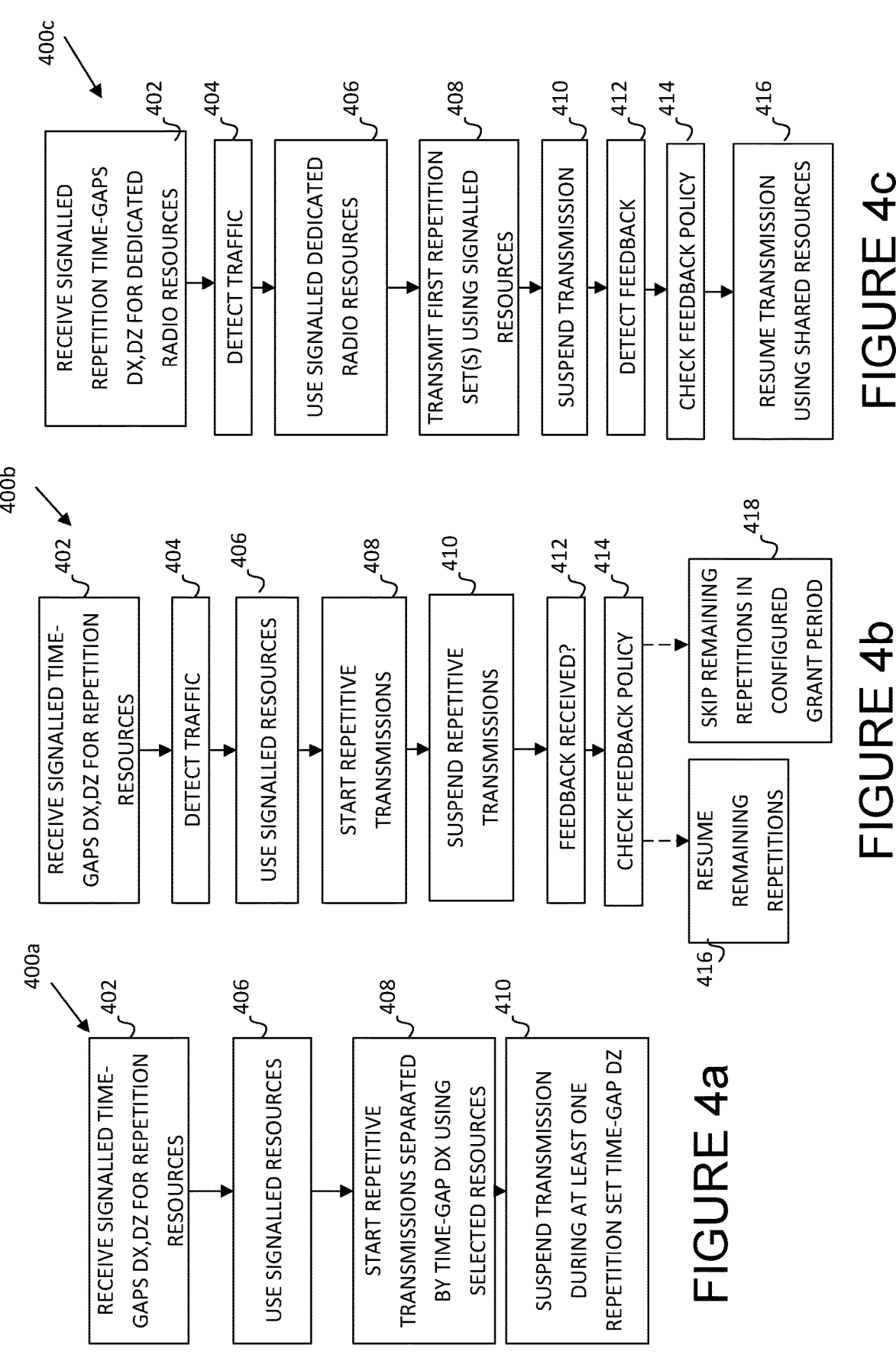

400c

402 RECEIVE SIGNALLED REPETITION TIME-GAPS DX,DZ FOR DEDICATED RADIO RESOURCES

404 DETECT TRAFFIC

406 USE SIGNALLED DEDICATED RADIO RESOURCES

408 TRANSMIT FIRST REPETITION SET(S) USING SIGNALLED RESOURCES

410 SUSPEND TRANSMISSION

412 DETECT FEEDBACK

414 CHECK FEEDBACK POLICY

416 RESUME TRANSMISSION USING SHARED RESOURCES

402 RECEIVE SIGNALLED TIME-GAPS DX,DZ FOR REPETITION RESOURCES

404 DETECT TRAFFIC

406 USE SIGNALLED RESOURCES

408 START REPETITIVE TRANSMISSIONS

410 SUSPEND REPETITIVE TRANSMISSIONS

412 FEEDBACK RECEIVED?

414 CHECK FEEDBACK POLICY

418 SKIP REMAINING REPETITIONS IN CONFIGURED GRANT PERIOD

416 RESUME REMAINING REPETITIONS

402 RECEIVE SIGNALLED TIME-GAPS DX,DZ FOR REPETITION RESOURCES

406 USE SIGNALLED RESOURCES

408 START REPETITIVE TRANSMISSIONS SEPARATED BY TIME-GAP DX USING SELECTED RESOURCES

410 SUSPEND TRANSMISSION DURING AT LEAST ONE REPETITION SET TIME-GAP DZ

DETERMINE AVAILABLE RADIO RESOURCES FOR GRANT — 504

CONFIGURE GRANT WITH AT LEAST ONE INTER-REPETITION SET TIME-GAP DZ AND AT LEAST ONE INTRA-REPETITION SET TIME-GAP DX BETWEEN TRANSMISSION OCCASIONS — 506

CONFIGURE FEEDBACK POLICY FOR AT LEAST FIRST REPETITION SET — 508

SIGNAL CONFIGURATION INFORMATION — 510

600

RECEIVE TRANSMISSION? — 602

GENERATE FEEDBACK — 604

PROVIDE FEEDBACK — 606

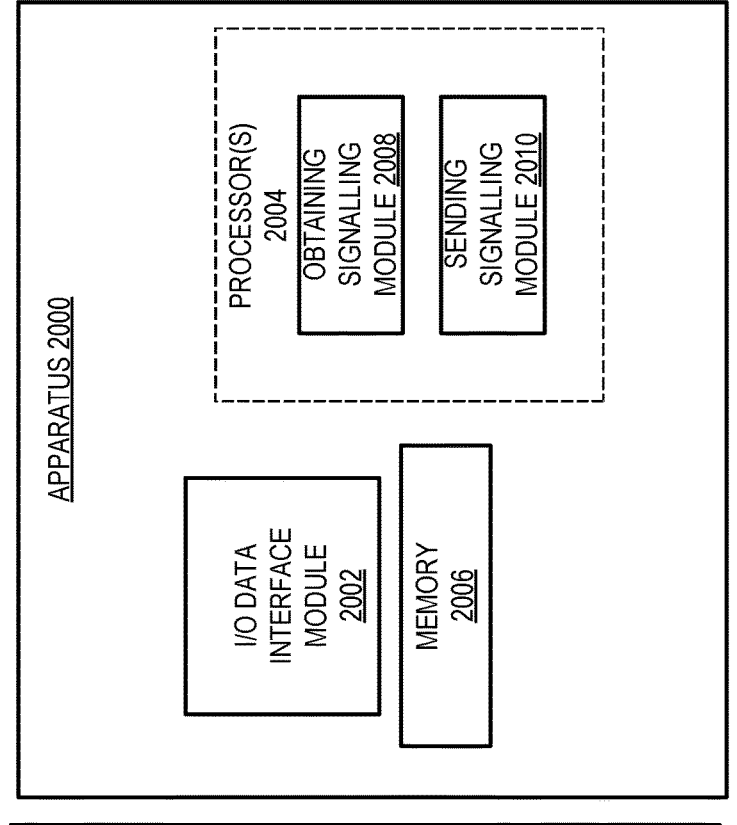
FIGURE 9b
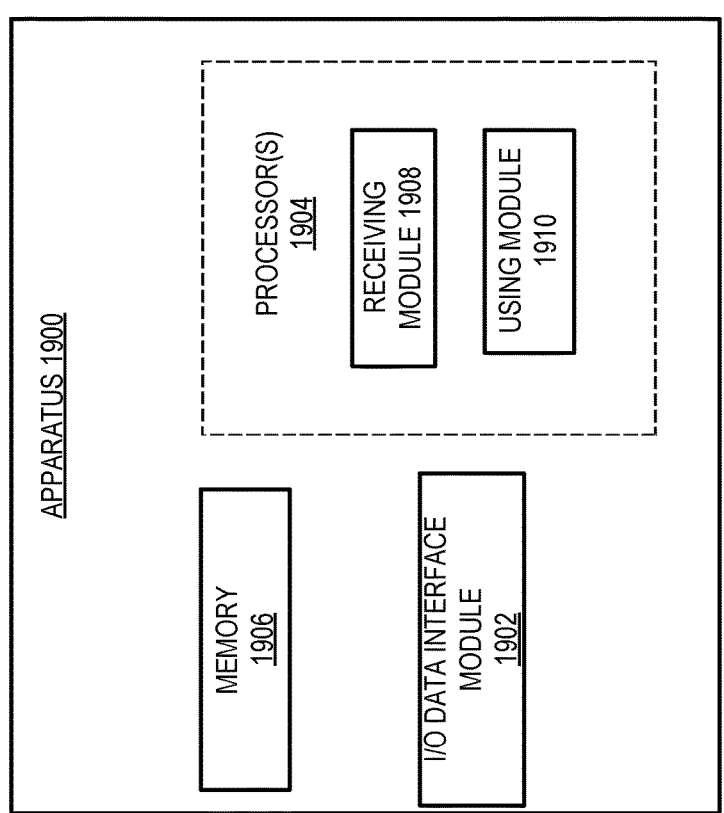
FIGURE 9a

RADIO ACCESS NETWORK RESOURCE GRANT ALLOCATION AND RELATED ASPECTS

CROSS-REFERENCE TO RELATED APPLICATIONS

This application is a 35 U.S.C § 371 national stage application for International Application No. PCT/SE2020/051151, entitled "RADIO ACCESS NETWORK RESOURCE GRANT ALLOCATION AND RELATED ASPECTS", filed on Dec. 1, 2020, assigned to the assignee hereof, and expressly incorporated herein by reference.

TECHNICAL FIELD

The present disclosure relates to radio access network, RAN, resource grant allocation and related aspects.

In particular, but not exclusively, the disclosed technology relates to a method of providing a configured grant, CG, to one or more wireless communication devices such as user equipment in a radio access network. The CG allocates radio resources for repetitive up-link, UL, transmission occasions, TOs, by a wireless communication device which are clustered into repetition sets or bursts which are dispersed within a configured grant period.

BACKGROUND

In a new radio, NR, or 5G radio access network, RAN, context, configured scheduling is used to allocate semi-static periodic assignments or grants for transmissions by a user equipment, UE. For UL transmissions, there are two types of configured scheduling schemes: Type 1 and Type 2. Type 1 CGs are configured via radio resource control, RRC, signalling only. Type 2 CGs use a similar configuration procedure to the semi-persistent scheduling uplink, SPS-UL, process used in long term evolution, LTE, networks. In this, some parameters are preconfigured via radio resource control, RRC signalling and some physical layer parameters are configured via a media access control, MAC, scheduling procedure.

In a NR RAN, the same resource configuration used for an initial transmission of a transport block, TB, is also used for a number of repetitions of that TB. However, each CG allocation has a specific pattern and each configured grant period starts with one or a plurality of uplink transmission occasions, UL-TOs, which are consecutively allocated. The consecutive allocation of UL TOs at the start of each configured grant period can create several problems. For example, depending on when a UE is to start a transmission within a particular configured grant period, there may be no remaining UL-TOs in that configured grant period. If the redundancy version, RV, being used has to change mid-period, the UE has to wait until the start of the next period to use an available UL-TO. Both of these situations increase the latency of the transmission.

Although a network node such as a next-generation node, gNB, in a RAN can reconfigure the number of UL-TOs in a CG period and/or the timing gap between consecutive repetitions when necessary, this increases the signalling overhead and the frequency of signalling from the gNB for both Type 1 and Type 2 CGs as the gNB needs to send either an RRC reconfiguration to update the relevant parameters or a DCI activation command to activate the new grant configuration parameters respectively. Besides repetition related configuration parameters, there are also other CG parameters such as the modulation and coding scheme, MCS, the physical uplink shared channel, PUSCH, mapping type, the CG periodicity, and the CG time offset which are all configured in a semi-static fashion. These other CG parameters cannot be quickly adapted if there are changes to any channel conditions or quality of service, QoS, requirement during the configured grant period, due to the consecutive allocation of all UL-TOs to the start of each grant period.

SUMMARY

The disclosed technology seeks to mitigate, obviate, alleviate, or eliminate one or more of the above example problems with current technology and/or to improve communications over a radio access network.

Various aspects of the disclosed technology are as set out in this summary section with examples of embodiments, which may be preferred embodiments.

Some embodiments of the disclosed technology may provide more opportunities for feedback during a configured grant period, for example, to enable CG parameters to be more quickly adapted.

Some embodiments of the disclosed technology seeks to provide a configured grant to a wireless communication device such as a UE in a radio access network for an UL transmission.

In some embodiments, a plurality of transmission occasions for repetitive UL transmissions are clustered into repetition sets which are spread throughout a configured grant period. In some embodiments, the repetition sets in the configured grant period are interspersed with at least one time gap of a duration sufficiently long to allow for feedback to be received within that grant period. In some embodiments, each resource grant configuration includes a plurality of sets of repetitive transmission occasions and two types of time gaps for each configured grant period. The first type of time gap is a time gap between the repetitions forming a repetition set or burst, also referred to herein as an intra-repetition set time gap during which the repetitive transmissions are suspended or paused. The other type of time gap follows a repetition set and is referred to herein as an inter-repetition set time gap during which the repetitive transmissions are suspended or paused.

A first aspect of the disclosed technology comprises: a method performed by a wireless communications device for sending repetitive transmissions in a radio access network, the method comprising: receiving signalling indicating, or allocating, at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and using, for at least one transport block, the signalled at least one configuration of radio resources for repetitively transmitting the at least one transport block in the at least one configured grant period.

In some embodiments, by dispersing the repetition sets within a configured grant period, instead of having consecutive allocation of repetition sets where each subsequent uplink transmission repetition follows a previous uplink transmission repetition consecutively in time at the start of each configured grant period, it is also possible to adapt a grant configuration during a grant period.

In some embodiments, the signalling allocating the at least one configuration of radio resources comprises signalling information sent by a network node, for example, an embodiment of a network node according to the second aspect.

In some embodiments, the signalling indicates at least one configuration of radio resources for a plurality of repetition sets comprising the time-domain repetitive transmissions in at least one configured grant period, and wherein the other time-gap between the repetitive transmissions comprises an intra-repetition set time gap with a duration dx between repetitive transmissions of a repetition set.

In some embodiments, the at least one time-gap comprises an inter-repetition set time gap of duration, dz, which follows at least the first repetition set of the at least one configured grant period.

In some embodiments, the using comprises: initiating, in a configured grant period of the at least one configured grant periods, the repetitive transmissions of the at least one transport block using the at least one configuration of radio resources; and suspending following transmitting the repetitive transmissions of a repetition set, subsequent transmissions for up to a duration dz of the intra-repetition set gap configured to follow that repetition set.

In some embodiments, the duration of the inter-repetition set time gap is sufficiently long to allow feedback from the network node, for example, from a gNB, to be receivable.

In some embodiments, the signalled configured duration, dz, of each inter-repetition set time gap following a repetition set varies within each of the at least one configured grant period.

In some embodiments, feedback received during an inter-repetition time gap in a configured grant period can accordingly be actioned without needing to wait for the end of the configured grant period. For example, resuming repetitions in the next repetition set may depend on what feedback is received and what actions are enabled (or disabled) by that grant period's feedback policy for that particular received feedback.

In some embodiments, another intra-repetition set time gap of duration, dy, is configured between adjacent repetitions of at least one other repetition set in the at least one configured grant period, and wherein the duration dy of the intra-repetition set time gap is different from the duration dx of a previous intra-repetition set time gap.

In some embodiments, the received (402) signalling further configures one or more or all of the following configuration parameters for the radio resources for each of the at least one configured grant periods: a number of transport blocks or feedback processes which can be suspended in that configured grant period; a maximum number of inter-repetition set time gaps, each of duration dz, during which the repetitive transmissions of each transport block or feedback process in that configured grant period are suspended; a maximum number of repetitions, K, in a repetition set; and a redundancy version, RV, sequence for each repetition set in that configured grant period.

In some embodiments, the signalled configuration of radio resources is signalled to at least one other wireless communications device (110) which with the wireless communications device (110) form a group of wireless communications devices (110), wherein the signalling indicates dedicated radio resources for at least one repetition set for use by each wireless communications device (110) of the group and shared radio resources for at least one other repetition set for shared use by the wireless communication devices (110) of the group.

In some embodiments, the method further comprises detecting, by the wireless communications device 110, feedback received during an inter-repetition set time gap in one of the at least one configured grant periods; and based on the detected feedback, resuming or skipping one or more remaining repetition sets using the allocated resources for that configured grant period in accordance with a feedback policy.

In some embodiments, the feedback policy determines one or more characteristics of one or more subsequent repetition sets in at least that configured grant period depending on the detected feedback meeting one or more feedback conditions.

In some embodiments, the feedback policy includes a feedback condition which must be met by feedback received by the wireless communications device if the wireless communications devices is to resume repetitive transmissions in another repetition set of that configured grant period or of a different configured grant period.

In some embodiments, the feedback policy determines at least one of: an intra-repetition set time gap, dy, between adjacent repetitive transmissions of a repetition set in the same or a different configured grant period of which follows the received feedback, where the duration of the intra-repetition set time gap, dy, is different from a previous duration of the intra-repetition set time gap dx; and a subsequent inter-repetition set time gap, of duration dz2, between adjacent sets of repetitive transmissions in the same or a different configured grant period which follows the received feedback, where the duration dz2 is different from the previous duration of the inter-repetition set time gap, dz.

In some embodiments, different feedback policies are configured for different repetition sets in at least one configured grant period.

In some embodiments, the feedback policy is a hybrid automatic repeat request, HARQ, feedback policy.

In some embodiments, the feedback policy suspends processing HARQ feedback during the inter-repetition set time gap of duration dz between two sets of repetitions.

In some embodiments, the feedback policy includes at least an acknowledgement, ACK, feedback condition which is met if, during or after the repetition set time gap, ACK feedback is received for any previously transmitted repetitive transmissions of the transport block, and wherein the method further comprises, in response to determining the ACK feedback condition is met, the wireless communications device skipping transmissions using the remaining repetitive transmissions for that transport block.

In some embodiments, the feedback policy includes instead or in addition at least a negative acknowledgement, NACK, condition which is met if, during or after the repetition set time gap, an NACK is received for any previously transmitted repetitive transmissions of the transport block, wherein the method further comprises, in response to determining the NACK feedback condition is met, the wireless communications device resuming the remaining repetitive transmissions of the transport block until the next repetition set time gap occurs.

In some embodiments, the feedback policy includes instead or in addition at least a feedback condition which is met if, during or after the repetition set time gap, neither ACK feedback or NACK feedback is received for any previous repetitive transmissions of the transport block, wherein the method further comprises, in response to determining the feedback condition is met, the wireless communications device resuming repetitive transmissions of the transport block until the next repetition set time gap starts.

In some embodiments, the feedback policy determines if the wireless communications device resumes repetitive transmissions using a different redundancy version to the redundancy version of previous repetitive transmissions In some embodiments, the at least one signalled configuration of radio resources are used responsive to determining the at least one transport block comprises delay sensitive traffic.

In some embodiments, the method further comprises: providing user data; and forwarding the user data to a host computer via transmission to a network node configured to provide base station functionality to the wireless communications device.

A second aspect of the disclosed technology comprises a method performed by a network node in a radio access network, the network node being configured to grant radio resources to a plurality of wireless communications devices, the method comprising: obtaining signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and sending the signalling information to at least one of the plurality of wireless communication devices. In some embodiments, the obtaining comprises generating the signalling information. In some embodiments, the obtaining comprises receiving the signalling information.

In some embodiments, the signalling information indicates at least one configuration of radio resources for a plurality of repetition sets comprising the time-domain repetitive transmissions in at least one configured grant period, and wherein the other time-gap between the repetitive transmissions comprises an intra-repetition set time gap with a duration dx between repetitive transmissions of a repetition set.

In some embodiments, the at least one time-gap comprises an inter-repetition set time gap of duration dz which follows at least the first repetition set of the at least one configured grant period.

In some embodiments, the signalling includes a feedback policy for any feedback which is received by the at least one wireless communications device in an inter-repetition set time gap of duration dz.

In some embodiments, the signalling includes at least one configuration of radio resources comprising a intra-repetition set time gap with a different duration dy between repetitive transmissions in at least one other repetition set in the configured grant period.

In some embodiments, the signalling further includes one or more of the following grant configuration parameters: a number of transport blocks or feedback processes for which repetitive transmissions can be suspended in a configured grant period; a maximum number of time gaps each having duration dz during which repetitive transmissions of each transport block or feedback process are suspended in a configured grant period; a maximum number of repetitive transmissions, K, for a configured grant period; and a redundancy version, RV, sequence for each repetition set in a configured grant period.

In some embodiments, the signalling comprises at least one of the following: system information signalling; dedicated radio resource control, RRC, signalling; media access control, MAC, control element, CE, signalling; and downlink control information, DCI, signalling.

In some embodiments, signalling includes a feedback policy for feedback received by the wireless communications device following a repetition set.

In some embodiments, the feedback policy includes at least one rule or condition for resuming any remaining repetitive transmissions in at least one other repetition set of the same or another configured grant period or another configured grant.

In some embodiments, the feedback policy is configured for at least one repetition set which is different from a feedback policy configured for at least one other repetition set in a configured grant period.

In some embodiments, the feedback policy is configurable to selectively enable or disable whether one type or more types of all feedback is receivable by the wireless communications device during a repetition set time gap.

In some embodiments, the network node is a gNB network node configured to provide base station functionality to the wireless communications device.

In some embodiments, the method further comprises the network node signalling to a group of wireless communication devices, a configuration or indication of at least some dedicated radio resources for at least one repetition set transmitted by a wireless communication device of the group of wireless communication devices in a configured grant period and a configuration or indication of at least some shared radio resources for at least one other repetition set in the configured grant period for shared use by that wireless communication device with the other wireless communication devices in the group.

In some embodiments, the method further comprises: obtaining user data, and forwarding the user data to a host computer or a wireless communications device.

A third aspect of the disclosed technology comprises a wireless communications device for sending repetitive transmissions in a radio access network, the wireless communications device comprising: processing circuitry configured to receive signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and to use, for at least one transport block, the signalled at least one configuration of radio resources for repetitively transmitting the at least one transport block in the at least one configured grant period.

In some embodiments of the wireless communications device, the processing circuitry is configured to perform any one of the embodiments of the method of first aspect.

A fourth aspect of the disclosed technology, comprises a network node configured to grant radio resources to a plurality of wireless communications devices, the network node comprising processing circuitry configured to obtain signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to send the signalling information to at least one of the plurality of wireless communication devices.

In some embodiments of the network node of the fourth aspect, the processing circuitry is configured to perform any one of the embodiments of the method of the second aspect.

A fifth aspect of the disclosed technology comprises a user equipment (UE) for sending repetitive transmissions in a radio access network, the UE comprising: an antenna configured to send and receive wireless signals; radio front-end circuitry connected to the antenna and to processing circuitry, and configured to condition signals communicated between the antenna and the processing circuitry; the processing circuitry being configured to receive signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and use, for at least one transport block, the signalled at least one configuration of radio resources for repetitively transmitting the at least one transport block in the at least one configured grant period; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

In some embodiments of the user equipment (UE) of the fifth aspect, the UE comprises the wireless communications device according to the third aspect, wherein the processing circuitry is configured to perform any one of the embodiments of the first method aspect.

A sixth aspect of the disclosed technology comprises a communication system including a host computer comprising processing circuitry configured to provide user data; and a communication interface configured to forward the user data to a radio access network for transmission to a user equipment, UE, wherein the radio access network comprises a network node having a radio interface and processing circuitry, the network node's processing circuitry configured to perform any one of the embodiments of the method according to the second aspect. In some embodiments, the communication system further includes the network node and/or the UE, wherein the UE is configured to communicate with the network node. In some embodiments, the processing circuitry of the host computer is configured to execute a host application, thereby providing the user data; and the UE comprises processing circuitry configured to execute a client application associated with the host application.

A seventh aspect of the disclosed technology comprises a method implemented in a communication system including a host computer, a network node providing base station functionality and a user equipment (UE), the method comprising: at the host computer, providing user data; and at the host computer, initiating a transmission carrying the user data to the UE via a radio access network comprising the network node, wherein the network node performs any one of the embodiments of the second method aspect.

In some embodiments the method further comprises, at the network node, transmitting the user data.

In some embodiments, the user data is provided at the host computer by executing a host application, and wherein the method further comprises, at the UE, executing a client application associated with the host application.

An eighth aspect of the disclosed technology comprises a user equipment (UE) configured to communicate with a network node providing base station functionality, the UE comprising a radio interface and processing circuitry configured to perform any one of the embodiments of the method of the seventh aspect.

A ninth aspect of the disclosed technology comprises a communication system including a host computer comprising: processing circuitry configured to provide user data; and a communication interface configured to forward user data to a cellular network, for example, a radio access network, for transmission to a user equipment (UE), wherein the UE comprises a radio interface and processing circuitry, the UE's components configured to perform any one of the embodiments of the method of the first aspect.

In some embodiments of the communication system of the ninth aspect, the cellular network, for example a radio access network, further includes a network node configured to communicate with the UE.

In some embodiments of the communication of the ninth aspect, the processing circuitry of the host computer is configured to execute a host application, thereby providing the user data; and the UE's processing circuitry is configured to execute a client application associated with the host application.

A tenth aspect of the disclosed technology comprises a method implemented in a communication system including a host computer, a network node configured to provide base station functionality and a user equipment (UE), the method comprising: at the host computer, providing user data; and at the host computer, initiating a transmission carrying the user data to the UE via a radio network comprising the network node, wherein the UE performs any one of the embodiments of the method of the first aspect.

An eleventh aspect of the disclosed technology comprises a communication system including a host computer comprising: communication interface configured to receive user data originating from a transmission from a user equipment (UE) to a network node configured to provide base station functionality, wherein the UE comprises a radio interface and processing circuitry, the UE's processing circuitry configured to perform any one of the embodiments of the method of the first aspect. In some embodiments of the eleventh aspect, the communication system further includes the UE and/or the network node configured to provide base station functionality, wherein the network node comprises a radio interface configured to communicate with the UE and a communication interface configured to forward to the host computer the user data carried by a transmission from the UE to the base station.

In some embodiments of the eleventh aspect, the processing circuitry of the host computer is configured to execute a host application; and the UE's processing circuitry is configured to execute a client application associated with the host application, thereby providing the user data.

In some embodiments of the eleventh aspect, the processing circuitry of the host computer is configured to execute a host application, thereby providing request data; and the UE's processing circuitry is configured to execute a client application associated with the host application, thereby providing the user data in response to the request data.

A twelfth aspect of the disclosed technology comprises a method implemented in a communication system including a host computer, a network node configured to provide base station functionality and a user equipment, UE, the method comprising: at the host computer, receiving user data transmitted to the base station from the UE, wherein the UE performs any one of the methods of the first aspect. In some embodiments of the method of the twelfth aspect, the method further comprises, at the UE, providing the user data to the base station. In some embodiments of the method of the twelfth aspect, the method further comprises, at the UE, executing a client application, thereby providing the user data to be transmitted; and at the host computer, executing a host application associated with the client application. In some embodiments of the method of the twelfth aspect, the method further comprises, at the UE, executing a client application, and at the UE, receiving input data to the client application, the input data being provided at the host computer by executing a host application associated with the client application, wherein the user data to be transmitted is provided by the client application in response to the input data.

A thirteenth aspect of the disclosed technology comprises a communication system including a host computer comprising a communication interface configured to receive user data originating from a transmission from a user equipment, UE, to a network node providing base station functionality, wherein the network node comprises a radio interface and processing circuitry, the network node's processing circuitry being configured to perform any one of the embodiments of the method of the second aspect. In some embodiments of the thirteenth aspect, the communication system further includes the network node and/or the UE, wherein the UE is configured to communicate with the base station. In some embodiments of the thirteenth aspect, the communication system further includes the processing circuitry of the host computer is configured to execute a host application; and the UE is configured to execute a client application associated with the host application, thereby providing the user data to be received by the host computer.

A fourteenth aspect of the disclosed technology comprises a method implemented in a communication system including a host computer, a network node configured to provide base station functionality and a user equipment (UE), the method comprising: at the host computer, receiving, from the network node, user data originating from a transmission which the network node has received from the UE, wherein the UE performs any one of the embodiments of the first method aspect. In some embodiments of the fourteenth aspect, the method further comprises at the network node, receiving the user data from the UE. In some embodiments of the fourteenth aspect, the method further comprises at the network node, initiating a transmission of the received user data to the host computer.

A fifteenth aspect of the disclosed technology comprises a computer readable storage medium comprising computer code, which when loaded and executed by one or more processors or processing circuitry of a wireless communications device, causes the wireless communications device to perform any one of the embodiments of the first method aspect.

A sixteenth aspect of the disclosed technology comprises a computer readable storage medium comprising computer code, which when loaded and executed by one or more processors or processing circuitry of a network node, causes the network node to perform any one of the embodiments of a method according to the second aspect.

A seventeenth aspect of the disclosed technology comprises an apparatus or control circuitry for performing repetitive transmissions in a radio access network, the apparatus or control circuitry comprising: means or at least one module configured to receive signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and means or at least one module configured to use, for at least one transport block, the signalled at least one configuration of radio resources for repetitively transmitting the at least one transport block in the at least one configured grant period. In some embodiments of the apparatus or control circuitry, the apparatus or control circuitry further comprises means or one or more modules to perform one of the embodiments of the method of the first aspect.

An eighteenth aspect of the disclosed technology comprises an apparatus or control circuitry configured to grant radio resources to a plurality of wireless communications devices, the apparatus or control circuitry comprising means or at least one module configured to obtain signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and means or at least one module to send the signalling information to at least one of the plurality of wireless communication devices.

In some embodiments, the apparatus or control circuitry of the eighteenth aspects further comprises means or one or more modules configured to perform any one of the embodiments of a method according to the second aspect.

A nineteenth aspect of the disclosed technology comprises a carrier signal comprising signalling from a network node according to any of the embodiments of the fourth aspect to at least one wireless communications device according to an embodiment of the third aspect and/or, for example, comprising user equipment, UE, according to any one of the embodiments of the fifth or eighth aspects, wherein the signalling comprises information indicating a plurality of parameters for a configured grant of radio resources for a plurality of repetitive transmissions.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which:

FIGS. 4a, 4b and 4c illustrate schematically different examples of a method performed by a wireless communications device according to some embodiments of the disclosed technology;

FIG. 9a illustrates schematically an example embodiment of computer apparatus on which a method according to an embodiment of the disclosed technology may be implemented;

FIG. 9b illustrates schematically an example embodiment of computer apparatus on which a method according to another embodiment of the disclosed technology may be implemented;

DETAILED DESCRIPTION

Figure 1:
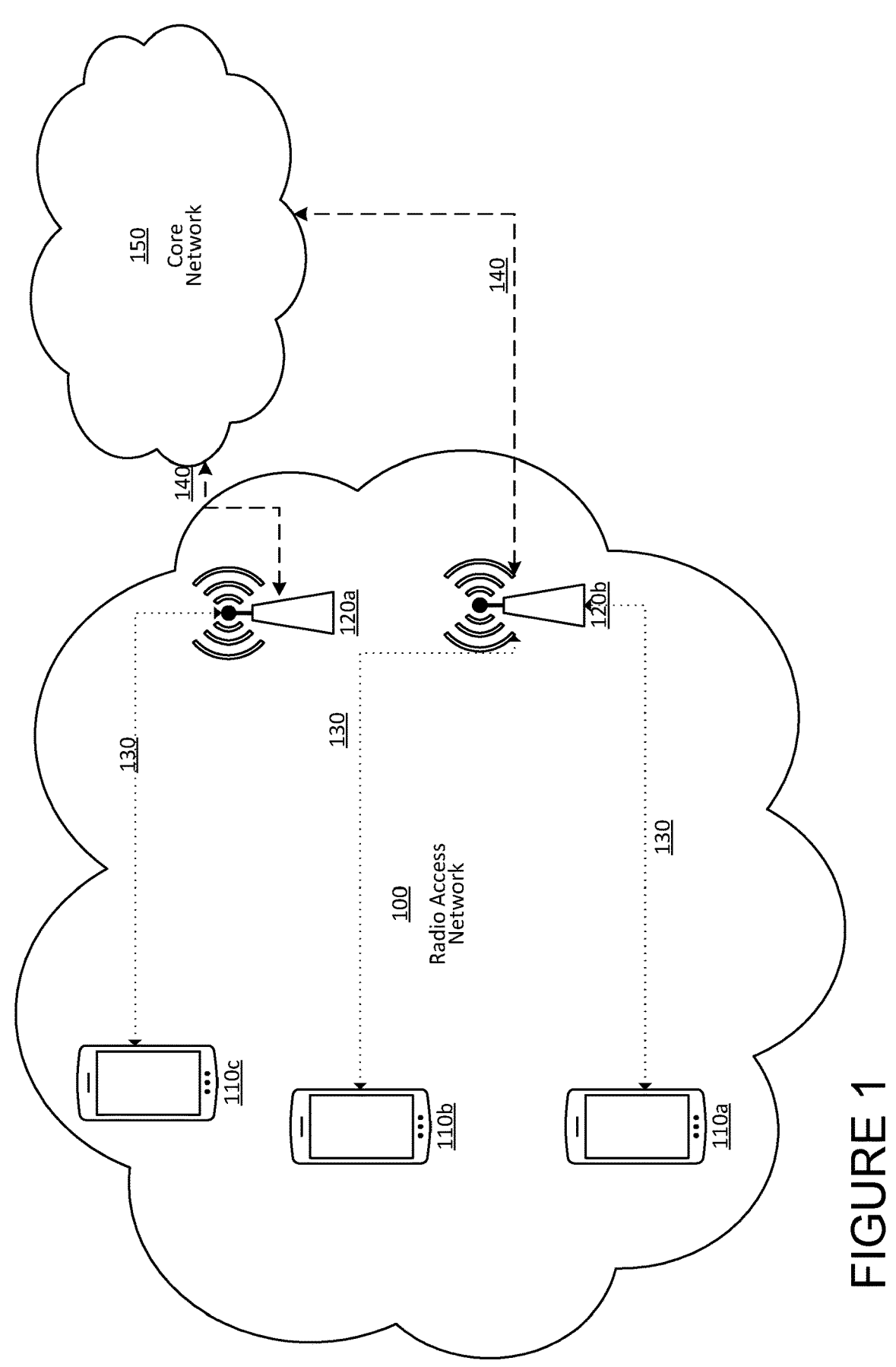
FIG. 1 schematically illustrates a radio access network in which radio resources are granted to wireless communications devices according to some embodiments of the disclosed technology.

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only and is not intended to limit the disclosed technology embodiments described herein. As used herein, the singular forms "a", "an" and "the" are intended to include the plural forms as well, unless the context clearly indicates otherwise.

FIG. 1 schematically illustrates an example embodiment of a communication system which comprises a radio access network 100 comprising at least one network node 120 which is configured to implement one of the disclosed embodiments of a method 500 according to the second aspect disclosed herein, for example, a method for allocating a configured grant of radio resources for UL-TOs to one or more wireless communications devices 110. The one or more wireless communication devices 110 comprise one or more user equipment 110 in some embodiments but also comprise other types of wireless communications devices which are able to receive and use an allocated configured grant of radio resources for UL-TOs from a network node 120. The wireless communications devices 110 shown in FIG. 1 are configured to implement one of the disclosed embodiments of a method 400 for determining radio resources for repetitive UL-TOs in the radio access network 100 of the communication system of FIG. 1.

In the example embodiment of the communications system shown in FIG. 1, the plurality of wireless communications devices 110 are labelled wireless communications devices 110a, 110b, and 110c. One or more or all of the wireless communications devices 110 may be user equipment, UE, or alternatively, any other type of wireless communications device or component, including so called internet of things, IOT, devices which can autonomously initiate wireless communications. The wireless communications devices 110 are configured to communicate with one or more network nodes 120a, 120b, using a radio access network 100. Each network node 120a, 120b is capable of connecting to a core network 150 using suitable wired or wireless communication links 140. The network nodes 120a, 120b allocate a configured grant to a group of wireless communications devices 110a,b,c in some embodiments described later below.

For simplicity, the communications system of FIG. 1 only depicts radio access network 100, core network 150, network nodes 120a and 120b, and wireless communications devices 110a, 110b, and 110c. In practice, as would be apparent to anyone of ordinary skill in the art, the radio access network 100 may further include any additional elements suitable to support communication between wireless communications devices or between a wireless communications device and another communication device, such as a landline telephone, a service provider, or any other network node or end device. Of the illustrated components, network node 120 and wireless communications device 110 are depicted with additional detail. The radio access network 100 may provide communication and other types of services to one or more wireless communications devices 110 to facilitate the wireless communications devices' access to and/or use of the services provided by, or via, the radio access network 100.

The radio access network 100 may comprise a Long Term Evolution, LTE, and/or other suitable 4G, 5G, or 6G or later standard radio access network. Core networks 150 comprises one or more backhaul networks, core networks, IP networks, public switched telephone networks, PSTNs, packet data networks, optical networks, wide-area networks, WANs, and may also comprise one or more local area networks, LANs, wireless local area networks, WLANs, wired networks, wireless networks, metropolitan area networks, and other networks to enable communication 140 between devices.

Network node 120 and wireless communications device 110 comprise various components described in more detail below. These components work together in order to provide network node and/or wireless communications device functionality, such as providing wireless connections 130, 140 in a communications system 100, 150. In different embodiments, the communications system 100, 150 may comprise any number of wired or wireless networks, network nodes 120, wireless communications devices 110, and/or any other components or systems that may facilitate or participate in the communication of data and/or signals via wireless connections 130, 140.

Figures 2A, 2B:
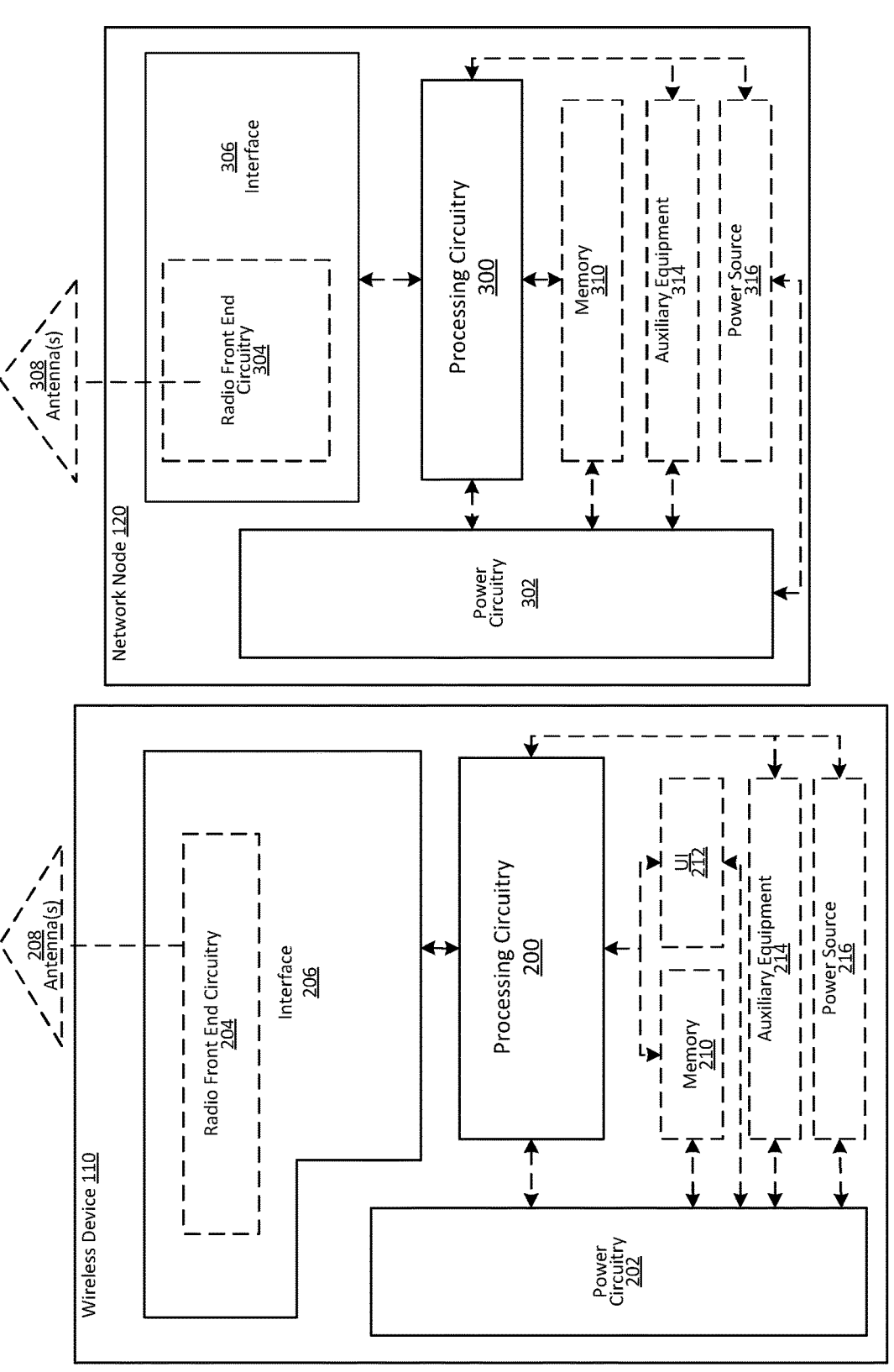
FIG. 2a schematically illustrates an example of a wireless communications device which receives signalling for a configured grant of radio resources according to some embodiments of the disclosed technology.
FIG. 2b schematically illustrates a network node which generates and provides signalling for a configured grant of radio resources to a wireless communications device according to some embodiments of the disclosed technology.

FIG. 2a shows schematically an example embodiment of a wireless communications device 110 such as FIG. 1 shows as wireless communications devices 110a,b,c. The wireless communications device 110 may comprise an embodiment of the third aspect disclosed herein, and may, in some embodiments comprise user equipment, UE, according to the fifth or eight aspects in some embodiments. Wireless communications device 110 is configured to perform one of the disclosed embodiments of a method 400 for determining radio resources for repetitive uplink transmission occasions in a radio access network 100. Method 400 may comprise, for example, an embodiment of the first method aspect disclosed herein.

One example of wireless communications device 110 comprises a wireless communications device which is configured, for example, to perform an embodiment of method 400 comprising: receiving 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and using (406), for at least one transport block, the signalled at least one configuration of radio resources for repetitively transmitting the at least one transport block in the at least one configured grant period. The signalling indicates at least one configuration of radio resources for a plurality of repetition sets comprising the time-domain repetitive transmissions in at least one configured grant period, and wherein the other time-gap between the repetitive transmissions comprises an intra-repetition set time gap with a duration dx between repetitive transmissions of a repetition set. the at least one time-gap comprises an inter-repetition set time gap of duration dz which follows at least the first repetition set of the at least one configured grant period.

In some embodiments, the using comprises initiating 408, in a configured grant period of the at least one configured grant periods, the repetitive transmissions of the at least one transport block using the at least one configuration of radio resources, and suspending 410, following transmitting the repetitive transmissions of a repetition set, subsequent transmissions for up to a duration dz of the intra-repetition set gap configured to follow that repetition set.

Additional embodiments of method 400 performed by the wireless communications device 110 are described in more detail later below.

The example embodiment of the wireless communications device 110 illustrated in FIG. 2a comprises an antenna 208 connected via a suitable interface 206 to radio front end circuitry 204. The interface 206 is connected to a processing circuitry or processor(s) 200. Processing circuitry 200 is configured to write and retrieve data from memory 210 and can also receive, and cause to be displayed, data via user interface, UI, 212 (the display is not shown in FIG. 2a for clarity). In some embodiments, the wireless communications device 110 includes optional auxiliary equipment 214 such as, for example, one or more sensors or other data input and/or output interfaces. The various components of each wireless communications device 110 are powered using a suitable power source, for example, power circuitry 202 may receive power from a power source 216 and distribute power to the components of the wireless communications device 110. Power source 216 may be an internal power source, such as one or more batteries, which may be rechargeable via an external power supply and/or be replaceable batteries. An external power source may comprise a conventional or off-grid power source.

Some embodiments of the wireless communications device 110 illustrated in FIG. 2a and also shown as wireless communications devices 110a,b,c in FIG. 1 comprise multiple sets of one or more of the illustrated components shown in FIG. 2a for different wireless technologies, such as, for example, GSM, WCDMA, LTE, NR, WiFi, WiMAX, or Bluetooth wireless technologies. The components for these wireless technologies may be integrated into the same or different chips or set of chips as the components for other technologies and/or other components within wireless communications device 110.

The processing circuitry 200 illustrated in FIG. 2a may comprise one or more or a combination of: a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless communications device 110 components, such as memory 210, wireless communications device 110 functionality. Such functionality may include providing any of the various wireless features or benefits discussed herein, for example, processing circuitry 200 may execute instructions stored in memory 210 or in memory within processing circuitry 200 to provide the functionality disclosed herein.

In some embodiments, some or all of the functionality described herein as being performed by a wireless communications device may be provided by the processing circuitry 200 executing instructions stored on memory or other form of computer-readable storage medium 210. In alternative embodiments, some or all of the functionality may be provided by processing circuitry 200 without executing instructions stored in memory, such as in a hard-wired manner. The processing circuitry 200 may be configured to perform any one or more or all of the determining, calculating, or similar operations (e.g., certain obtaining operations) described herein as being performed by an embodiment of the wireless communications device 110.

Memory 210 as illustrated in FIG. 2a is operable to store at least one computer program, software, or application comprising a set of instructions capable of being executed by processing circuitry 200. Memory 210 may include computer memory (e.g., Random Access Memory, RAM, or Read Only Memory, ROM), mass storage media (e.g., a hard disk), removable storage media (e.g., a flash drive or other form of memory stick, a Compact Disk, CD or a Digital Video Disk, DVD, or removable memory drive), and/or any other volatile or non-volatile, non-transitory device readable and/or computer executable memory devices that store information, data, and/or instructions that may be used by processing circuitry 200. In some embodiments, processing circuitry 200 and memory 210 may be considered to be integrated. Memory 200 may also be distributed and be provided in part remotely in some embodiments.

Example embodiments of wireless communications device 110, such as, for example, wireless communications devices 110a,b,c, as shown in FIG. 1 include, but are not limited to, a smart phone, a mobile phone, a cell phone, a voice over IP, VoIP, phone, a wireless local loop phone, a desktop computer, a personal digital assistant, PDA, a wireless cameras, a gaming console or device, a music storage device, a playback appliance, a wearable terminal device, a wireless endpoint, a mobile station, a tablet, a laptop, a laptop-embedded equipment, LEE, a laptop-mounted equipment, LME, a smart device, a wireless customer-premise equipment, CPE, a vehicle-mounted wireless terminal device, etc.

Some embodiments of wireless communications device 110 support device-to-device, D2D, communication, for example by implementing a 3GPP standard for sidelink communication, vehicle-to-vehicle (V2V), vehicle-to-infrastructure (V2I), vehicle-to-everything (V2X). In some embodiments, in a context such as the so-called Internet of Things (IoT), wireless communications device 110 comprises a machine or other device that performs monitoring and/or measurements, and transmits the results of such monitoring and/or measurements to another wireless communications device and/or a network node. In some embodiments, the wireless communications device 110 comprises a UE implementing the 3GPP narrow band internet of things (NB-IoT) standard. Examples of such an embodiment of wireless communications device 110 include machines or devices such as sensors, metering devices such as power meters, residential or industrial machinery, or home or personal appliances (e.g. refrigerators, televisions, heating controllers, etc.), and personal wearables (e.g., watches, fitness trackers, etc.). In some embodiments, wireless communications device 110 represents a vehicle or other equipment that is capable of monitoring and/or reporting on its operational status or other functions associated with its operation.

A wireless communications device 110 as described above in some embodiments represents an endpoint of a wireless connection, in which case the device may be referred to as a wireless terminal. Furthermore, a wireless communications device 110 as described above may be mobile, in which case it may also be referred to as a mobile device or a mobile terminal.

Some embodiments of the wireless communications device 110 configured to send repetitive transmissions in radio access network 100 comprise: processing circuitry configured to perform:

receiving 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and using 406, for at least one transport block, the signalled at least one configuration of radio resources for repetitively transmitting the at least one transport block in the at least one configured grant period; and power supply circuitry configured to supply power to the wireless communications device 110.

In some embodiments of the wireless communications device 110, the processing circuitry is configured to perform any one of the of the embodiments of method 400 as disclosed herein.

FIG. 2*b* illustrates a network node 120 according to an embodiment of the disclosed technology, such as, for example, a network node according to an embodiment of the fourth aspect disclosed herein, such as network node 120*a*, 120*b* shown in FIG. 1. Network node 120 is configured to implement one of the disclosed embodiments of a method 500 for allocating a configured grant of radio resources for UL TOs to one or more wireless communications devices 110 which are described in more detail later below. Method 500 (and 600) as shown in, for example, FIGS. 5*a* and 5*b*, may comprise, for example, one or more embodiments of the second method aspect disclosed herein. For example, one embodiment of a network node 120 comprises a gNB or other type of node which is configured to provide base station type access functionality in a radio access network 100 to a plurality of wireless communications devices 110. In one embodiment, network node 120 performs a method 500 for allocating a configured grant of radio resources for UL-TOs by a wireless communications device which comprises: obtaining signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and sending signalling information to at least one of the plurality of wireless communication devices. In some embodiments, the obtaining comprises generating the signalling information. In some embodiments, the obtaining comprises receiving the signalling information. In at least some, if not all embodiments of method 500, the signalling indicates at least one configuration of radio resources for a plurality of repetition sets comprising the time-domain repetitive transmissions in at least one configured grant period, and wherein the other time-gap between the repetitive transmissions comprises an intra-repetition set time gap with a duration dx between repetitive transmissions of a repetition set. In at least some, if not all, embodiments of the method 500, the at least one time-gap comprises an inter-repetition set time gap of duration dz which follows at least the first repetition set of the at least one configured grant period.

In some embodiments, method 500 comprises obtaining, for example, by receiving or generating, signalling information comprises a grant configuration allocating at least one configuration of radio resources for a plurality of repetition sets in at least one configured grant period, each repetition set comprising time-domain repetitive transmissions, wherein the signalling indicates an inter-repetition set time gap with a duration, dz, to follow at least the first repetition set of a configured grant period and at least one intra-repetition time gap with a duration dx between the repetitive transmissions of at least the first repetition set in the configured grant period, and signalling 940 the configuration information to one or more wireless communications devices 110,110*a*,*b*,*c*, in the network. For example, in some embodiments, network node 120 signals at least one configuration of radio resources for a plurality of repetition sets in at least one configured grant period, each repetition set comprising time-domain repetitive transmissions, wherein the signalling indicates an inter-repetition set time gap with a duration, dz, to follow at least the first repetition set of a configured grant period and at least one intra-repetition time gap with a duration dx between the repetitive transmissions of at least the first repetition set in the configured grant period to at least one of the plurality of wireless communications devices over the wireless communications access network. Further embodiments of method 500 are described in more detail later below.

The term network node 120 as used herein refers to equipment capable, configured, arranged and/or operable to communicate directly or indirectly with a wireless communications device 110 such as wireless communications devices 110*a*,*b*,*c* in FIG. 1 and/or with other network nodes 120 or equipment in a wireless radio access network 100 to enable and/or provide wireless radio access to the wireless communications devices 110 and/or to perform other functions (e.g., administration) in the wireless radio access network. Examples of network nodes include, but are not limited to, access points, APs, for example, radio APs, base stations, BSs, such as for example, radio base stations, Node Bs, evolved Node Bs, eNBs and NR NodeBs gNBs.

FIG. 2*b* shows a general example embodiment of such a network node 120 which may represent any suitable device (or group of devices) capable, configured, arranged, and/or operable to enable and/or provide a wireless communications device 110 with access to the wireless radio access network 100 or to provide some service to a wireless communications device 110 that has accessed the wireless radio access network 100. As shown in FIG. 2b, network node 120 comprises antenna(s) 308 which is connected via interface 306 to radio front end circuitry 304. The interface 306 is connected to processor(s) or processing circuitry 300. Processor(s) or processing circuitry 300 is configured to store and retrieve data from memory 310. Also shown in FIG. 2b is optional auxiliary equipment 314 which may include network management user interface technology for example. A power source 316 provides electrical energy via power circuitry 302 to the components of the network node 120.

Network node 120 may be implemented in any RAN which can support a CG configuration and may comprise a network node according to the fourth aspect disclosed herein in some embodiments. For example, in some embodiments, network node 120 comprises multiple different physical components that make up a single illustrated component. In some embodiments, network node 120 is composed of multiple physically separate components suitable for implementing at least one embodiment of method 500 and/or one or more embodiments of method 600 described in more detail later below, which are also referred to herein a method according to the second aspect. For example, in some embodiments, network node 120 comprises a gNB, but in other embodiments network node 120 may comprise another type of node which can allocate configured grants according to one of the disclosed embodiments of method 500 in an LTE, 5G, or 6G or later network. In some embodiments, network node 120 may be configured to support multiple radio access technologies (RATs). Network node 120 may also include multiple sets of the various illustrated components for different wireless technologies integrated into network node 120, such as, for example, GSM, WCDMA, LTE, NR, WiFi, or Bluetooth wireless technologies in addition to LTE, 5G or 6G later RATs.

The processing circuitry 300 of network node 120 is configured to perform one or more of or all of any determining, calculating, or similar operations (e.g., certain obtaining operations) described herein as being provided by a network node 120. These operations performed by processing circuitry 300 may include processing information obtained by processing circuitry 300 by, for example, converting the obtained information into other information, comparing the obtained information or converted information to information stored in the network node, and/or performing one or more operations based on the obtained information or converted information, and as a result of said processing making a determination. In some embodiments, processing circuitry 300 is configured to execute instructions stored in memory 310 to provide functionality providing, for example, any of the various wireless features, functions, or benefits discussed herein. In some embodiments, processing circuitry 300 may include a system on a chip, SOC.

In some embodiments, some or all of the functionality described herein as being provided by a network node 120, for example, functionality which is provided by a base station, eNB, gNB or other embodiment of network node 120 is performed by processing circuitry 300 executing instructions stored on device readable medium or memory 300 within processing circuitry 300 or external to processing circuitry 300. In alternative embodiments, some or all of the functionality may be provided by processing circuitry 300 without executing instructions stored on a separate or discrete memory component or module 310, for example, any suitable device readable (and/or writeable) medium, such as in a hard-wired manner. In any of those embodiments, whether executing instructions stored on a memory not, processing circuitry 300 can be configured to perform the described functionality.

The memory 300 of network node 120 may comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 300. Memory 310 may store any suitable instructions, data or information, including a computer program, software, an application including one or more of logic, rules, code, tables, etc. and/or other instructions capable of being executed by processing circuitry 300 and, utilized by network node 120. Memory 310 may be used to store any calculations made by processing circuitry 300 and/or any data received via interface 306. In some embodiments, the processing circuitry 300 and memory 310 are integrated. Memory may be also dispersed amongst one or more components of the network node and/or other network nodes. For example, memory 310 may comprises a plurality of different memory modules, including modules located on other network nodes in some embodiments.

Interface 306 is used in the wired or wireless communication of signalling and/or data between network node 120, network 100, and/or wireless communications devices 110. As illustrated, interface 306 comprises port(s)/terminal(s) to send and receive data, for example to and from network 100 over a wired connection. Interface 306 also includes radio front end circuitry 304 coupled to, or in certain embodiments a part of, antenna 308. Radio front end circuitry 304 comprises filters 198 and amplifiers 196. Radio front end circuitry 304 may be connected to antenna 308 and processing circuitry 300. Antenna 308 may be coupled to radio front end circuitry 306 and may be any type of antenna capable of transmitting and receiving data and/or signals wirelessly.

Antenna 308, interface 306, and/or processing circuitry 300 may be configured to perform any receiving operations and/or certain obtaining operations described herein as being performed by a network node. Similarly, antenna 308, interface 306, and/or processing circuitry 300 may be configured to perform any transmitting operations described herein as being performed by a network node. Power circuitry 302 may comprise, or be coupled to, power management circuitry and is configured to supply the components of network node 120 with power for performing the functionality described herein. Power circuitry 302 is used to distribute power from power source 316, which may comprise an internal or external battery or a mains power source, such as from a power distribution grid, or an alternative off-grid source of energy such as a solar or wind power source, and may include appropriate AC/DC and voltage transforming components (not shown in FIG. 2b).

Figure 3:
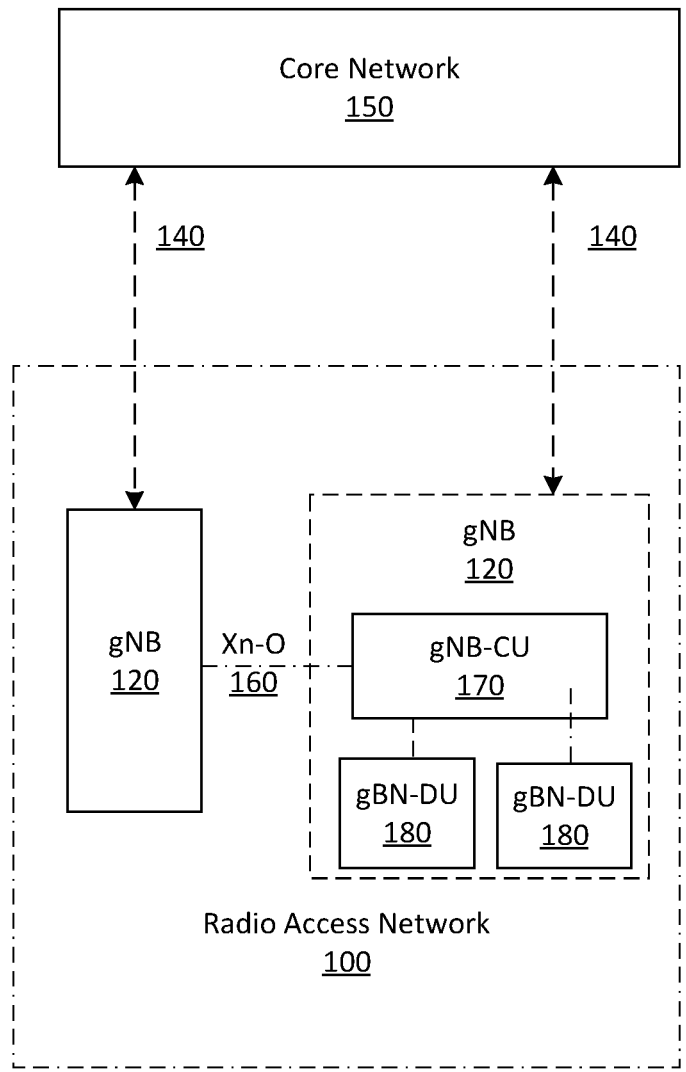
FIG. 3 schematically illustrates an example embodiment of the network node of FIG. 2b.

FIG. 3 shows schematically an example embodiment where network 100 is an access network such as a NR-RAN or next-generation RAN, NG-RAN, 100 for a core network 150. Two example network nodes 120 are shown in NR-RAN 100 in FIG. 3 as gNBs 120 which provide NR or NG-NR user plane and control plane protocol terminations towards one or more wireless communication devices 110 (not shown in FIG. 3). The gNBs are configured to connect to RAN 100 via suitable NG interfaces. In some embodiments, one or more or all of the network nodes 120 in NR-RAN 100 comprise a logical 5G or later radio communications standard, for example, 6G, network node 120. One or more of such network nodes 120 may be configured to provide functionality in a manner similar to that of a base station by providing allocating grants for radio resources for communications access over NR-RAN 100 to at least one wireless communications device 110 when RAN 100 is a 5G or later standard NR-RAN.

In some embodiments, one or more network nodes 120 in RAN 100 comprise a gNB node providing NR user plane and control plane protocol terminations towards a wireless communications device 110, for example, a wireless communications device comprising UE and/or one or more network nodes 120 in RAN 100 comprise ng-eNB providing E-UTRA user plane and control plane protocol terminations towards the UE wireless communications device 110. Both types of network node 120 (the gNB and ng-eNG types of network nodes) use the new NG interfaces toward the core network 150 but will use different radio interfaces towards the UE. The gNB and ng-eNG network nodes are linked together via an Xn-O interface in some embodiments as shown in FIG. 3. In some embodiments, the wireless core network 150 is a 4G core network and the RAN 100 is a NG-RAN network and each network node 120 may be a gNB node that connects to the 4G core network 150 in the form of a 4G eNB which acts as a master node, MeNB, in control of radio communications with the user equipment and an en-gNB node which is used as a secondary node, SgNB.

In some embodiments, for example, see the right-hand side gNB node 120 in FIG. 3, the functionality the gNB provides is distributed. In the example embodiment shown in FIG. 3, two gNBs 120 are shown connected via a NG logical interface to core network 150. Each of the gNB nodes 120 is capable of operating in one or more or all of a frequency division duplexing mode, a time division duplexing operational mode or both (dual mode operation). In some embodiments, the gNB nodes 120 are interconnected through a Xn-C logical interface.

In the schematic example shown in FIG. 3, two gNB network nodes 120 are shown where the right hand side gNB is illustrated in its functional form as comprising two functional blocks: a gNB centralized unit which is shown schematically as gNB-CU 170 and two gNB distributed units gNB-DU 180. The gNB-CU is connected via a logical interface to one or more gNB-DUs 180. In some embodiments, a gNB centralized unit gNB-CU 170 is further split into a control and user plane The disclosed example embodiments of the network nodes 120 described above are configured to implement one of the disclosed embodiments of method 500 or 600 described later on below. A network node 120 generates signalling for allocating a configured grant of radio resources which are sent as signalling information to one or more wireless communications devices 110 within its area of network coverage and may also provide feedback based on received repetitive transmissions, for example, as shown in the method 600 in FIG. 5b.

The signalling which each network node 120 generates informs each of the one or more receiving wireless communications devices 110 of grants for radio resources to be used by transmission occasions for repetitive transmissions of one or more transport blocks over RAN 100 as shown in FIG. 1 for example.

Some embodiments of network node 120 are configured to grant radio resources to a plurality of wireless communications devices 110. In some embodiments, the network node 120 comprises processing circuitry configured to obtain signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to send the signalling information to at least one of the plurality of wireless communication devices. In some embodiments, the processing circuitry is configured to obtain by generating the signalling information. In some embodiments, the processing circuitry is configured to obtain the signalling information by receiving the signalling information, for example, from another network node. In some embodiments, the processing circuitry is configured to perform any one of the disclosed embodiments of method 500 or second aspect disclosed herein.

Further detail of the way that the configured grant allocations signalled by a network node can be used by one or more receiving wireless communication devices is now being described with reference to FIGS. 4a to 4c, and 6a through to FIG. 8b of the accompanying drawings. It should be appreciated that the example operations described as being performed by wireless communications device 110, may be performed simultaneously by a number of wireless communications devices 110 up to the capacity supported by in radio access network 100, although only three example wireless communications devices 110, wireless communications devices 110a, b, c are shown in FIG. 1.

FIGS. 4a, 4b and 4c illustrate schematically three different example embodiments of method 400 which are performed by a wireless communications device 110 according to any of the disclosed embodiments of the disclosed technology. The order of the blocks illustrated in any of the methods disclosed however may change and one or more blocks may represent steps, functions or features of the method which are omitted in some embodiments unless their context clearly requires one or more previous steps, functions, or features to have been be previously performed.

FIG. 4a illustrates an example embodiment of method 400 comprising method 400a.

Method 400a comprises: receiving 402 signalling indicating at least one configuration of radio resources for a plurality of repetition sets in at least one configured grant period, using 406 the signalling grant allocation to start 408 an up-link transmission using allocated transmission occasions in a first one of a plurality of repetition sets allocated by the signalling, each repetition set comprising a plurality of time-domain repetitive radio transmissions. The signalling indicates an inter-repetition set time gap with a duration, dz, to follow at least the first repetition set of a configured grant period and at least one intra-repetition set time gap with a duration dx between the repetitive transmissions of at least the first repetition set in the configured grant period. In some embodiments, the signalling may be received during a configured grant period and changes the resources allocated for the remainder of that configured grant period or starts a new configured grant period. In some embodiments, the wireless communications device uses 406 the signalled configuration of radio resources for repetitively transmitting at least one transport block which comprises a particular type or category of traffic, for example, which comprises traffic with a low latency requirement, in the at least one configured grant period and then initiates 408 repetitive transmissions of the at least one transport block using the selected configuration of radio resources. The selecting 406 of method 400 may be performed responsive to a detecting 404 (see the example of FIGS. 4b and 4c) or otherwise determining that the at least one transport block comprises some type of delay sensitive traffic in some embodiments. After the first repetition set has been transmitted, method 400a further comprises suspending 410 subsequent repetitive transmissions for the longer inter-repetition set time gap duration dz.

Figure 7:
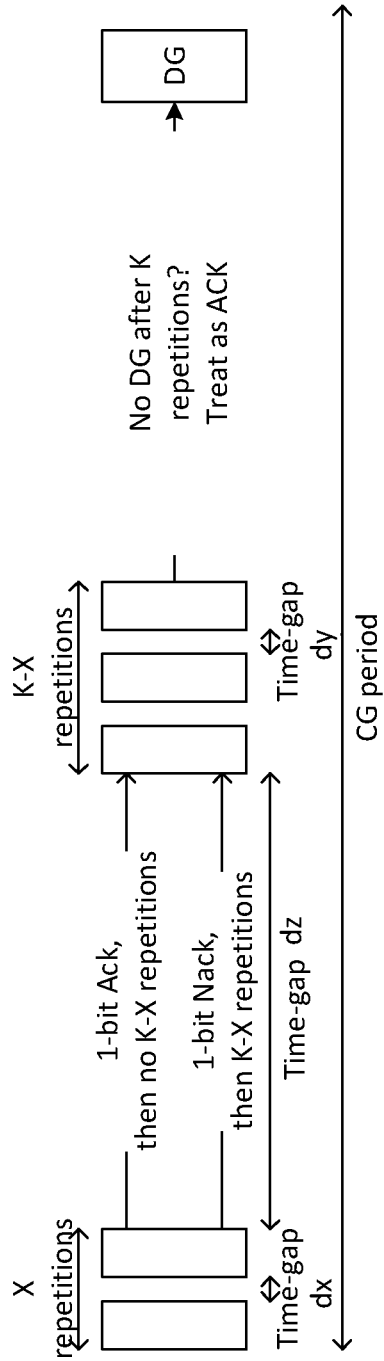
FIG. 7 illustrates schematically an example of how repetitions can be transmitted within a configured grant period according to an embodiment of the disclosed technology.

The term inter-repetition set time gap dx as used herein refers to the signalled time gap between individual transmission occasions within a repetition set. The term intra-repetition set time gap duration dz as used herein refers to the signalled time gap following each a repetition set before the next repetition set starts. In some embodiments, the signalling received 402 is received during a repetition set time gap of duration dz, for example, as feedback 412 in methods 400b or c, and configures or reconfigures respectively the following configuration parameters for the radio resources for a configured grant period: a duration, for the inter-repetition set time gap, dx during which transmissions are suspended between transmission occasions in the configured grant period; and a duration dz for each intra repetition set time gap during which transmissions are suspended between transmission occasions in the configured grant period. FIGS. 7 to 9 described in more detail below provide various examples of possible time gap configurations.

Another embodiment of method 400 is illustrated in FIG. 4b. As shown in FIG. 4b, method 400 comprises method 400b, which comprises: receiving 402 signalling indicating a plurality of time gaps of durations dx and dz for radio resources; detecting 404 traffic, for example, traffic which is delay sensitive such as traffic which has ultra low latency requirements for transmission over the access network 100, or high priority traffic. The wireless communications device 110 then selects 406 the signalled resources provided by the configured grant for the detected traffic to use and starts 408 a set of repetitive transmissions in the configured grant period for the signalled resources.

Each set of repetitive transmissions comprises repeated transmissions of the at least one transport block which use a plurality of configured transmission resources/occasions separated by an intra-repetition set time gap dx. Each set of repetitive transmissions is separated by another time gap of a longer duration, dz during which repetitions are suspended 410. After transmitting all of the repetitive transmissions of each repetition set, the method further comprises suspending 410 subsequent repetitive transmissions for the longer repetition gap dz. This enables the wireless communications devices 110 is able to detect if any feedback is received from network node 120 412. During each suspension period of duration dz for the repetitive transmissions, the wireless communications device is able to receive feedback. If feedback is received during time gap duration dz following a repetition set 412 as shown in FIG. 4b, then a check is made to see what actions are to be performed based on a feedback policy 414. The remaining repetitions in that configured grant period may resume 416 after the expiry of the intra-repetition set time gap of duration dz or may be skipped 418 in that configured grant period in some embodiments according to the feedback policy.

In some embodiments, the feedback policy is provided as part of the signalling 402. In some embodiments, a feedback policy may be provided by the feedback. In some embodiments, the feedback indicates that method 400a is to be performed for the remaining repetition sets of that configured grant period. In other words, in some embodiments, method 400a is performed and modifies the characteristics of the remaining repetitions 416 of method 400b for the duration of the original grant period. In some embodiments, the feedback received from the network node receiving the repetitive transmissions from the UE and the feedback policy of the UE configures the repetitive transmission occasions for a subsequent grant period.

In some embodiments, the signalling received 402 in method 400a comprises a different configuration radio resources for at least one other remaining repetition set of repetitive transmissions which are resumed as part of 416.

In some embodiments of method 400, the signalling 402 of method 400b signals dedicated radio resources for the transmission occasions of at least one previous repetition set in a configured grant period and the signalling 402 of method 400a signals shared radio resources are to be used for the transmission occasions of the remaining repetition sets in that configured grant period.

FIG. 4c shows an example embodiment of method 400 comprising method 400c which illustrates how the feedback can reconfigure the granted resources in the middle of a grant period. In FIG. 4c, the signalling 402 of the radio resources for the repetitive transmissions comprises signalling for dedicated and shared radio resources. The signalling configures inter-repetition set and intra-repetition set time gaps with respective durations dx, dz for the dedicated radio resources to a plurality of wireless communication devices 110, such as 100a,b,c in FIG. 1 which form a group of wireless communications devices able to share radio resources. When one of these wireless communications devices 110 detects 404 traffic it will use 406 the signalled transmission occasions for repetitive transmissions and start 408 transmitting the traffic using intra-repetition set time gaps which are each of duration dx between the repetitive transmissions until the number of repetitive transmissions that the signalling indicated form the first repetition set have all been transmitted. At this point, the wireless communications device 110 suspends 410 transmitting any further repetition transmissions for a time gap of duration dz. In the embodiment of method 400c illustrated, the wireless communications device checks 414 the feedback policy it received 412 feedback during the intra-repetition set time gap dz. Based on the rules that the feedback policy has for the detected feedback, the wireless communications device 110 determines that the remaining repetitive transmission occasions will use radio resources which are shared with the other wireless communication devices 110 in the group of wireless communication devices. The feedback policy provide rules for other types of feedback and in some embodiments, the feedback policy and/or the signalled grant configuration can disable certain types of feedback at the wireless communications device 110.

In some embodiments, instead of the shared radio resources used by one or more subsequent repetition sets in a configured grant period being allocated by the signalling 402, the feedback received after the first or a subsequent repetition set has completed and/or a feedback policy for that received feedback can change the resources and/or transmission occasions characteristics during the configured grant period for subsequent repetition sets. For example, in some embodiments, with the feedback signalling information is included for shared radio resources with the same or different time gap configurations dx, dz but in other embodiments of method 400, the feedback may include signalling for new radio resources with the same or different time gap configurations with durations dx1, dx2 (or dy), dx3, and dz1, dz2, dz3 to follow each repetition set. In some embodiments, the feedback policy which is checked 414 and which determines for what feedback the shared radio resources are to be used is provided with the signalling 402. In some embodiments, a feedback policy is sent as part of the feedback. This can allow a feedback policy to be updated during a configured grant period in some embodiments.

In some embodiments of method 400, such as, for example, one of the methods 400a,b,c shown in FIGS. 4a, 4b, and 4c, the feedback detected during the intra-repetition set time gap of duration dz is detected implicitly, or determined. For example, a NACK may be implicitly determined if there is no detected feedback during the intra-repetition set time gap dz. In some embodiments of method 400, the feedback received during a configured grant period may be feedback for a repetition set transmitted in a previous grant period.

By dispersing the repetitive transmission bursts or sets over the configured grant period rather than clustering them consecutively at the start of each configured grant period, the probability of collisions can be reduced in some embodiments. For example, if a transport block comprises a massive machine type communication, MTC, such as may occur in an internet-of-things network context, using method 400 to determine transmission occasions in a RAN 100 may decreases the likelihood of collisions occurring. For example, in some embodiments, the probability of different wireless communication devices using the same shared radio resource transmission occasions may be reduced by varying the inter-repetition set time gap duration dz and/or the intra-repetition set time gap dx signalled to different wireless communications devices 110 in a group of wireless communications devices which have bene allocated shared radio resources.

Some embodiments of method 400 as mentioned above may be implemented by a wireless communications device 100 in a manner which distinguishes between different types of traffic. For example, the selecting 406 of method 400 may only be performed if the detected traffic 402 is detected traffic which comprises delay sensitive traffic such as low-latency or ultra-low latency traffic or and/or other types of prioritised traffic in some embodiments. In other words, the at least one signalled configuration of radio resources are used responsive to determining the at least one transport block comprises delay sensitive traffic. In some embodiments, method 400 may further comprise: determining the at least one transport block comprises delay sensitive traffic, and responsive to a positive determination, selecting one of the at least one signalled configurations of radio resources for transmitting the delay sensitive traffic in the at least one configured grant period. Some of the embodiments herein disclosed technology accordingly support providing a grant configuration or ultra-reliable low-latency transmission (URLLC) traffic whose arrival may fluctuate sporadically in a semi-deterministic way in a configured grant period. For example, in some embodiments, feedback received during a configured grant period can modify the timing of any remaining transmissions in that configured grant period and may in even cause the remaining transmissions to be skipped in that grant configuration, depending on the feedback policy. This can improve spectral efficiency by terminating the configured grant.

In some embodiments of method 400, the signalling provided 402 configures the duration, dz, of the repetition set time gap following a repetition set to vary within each of the at least one configured grant period. For example, the duration dz may increase as the number of transmitted repetition sets increases within the configured grant period. In some embodiments, a feedback policy will vary the duration dz of subsequent repetition set time gaps.

In some embodiments of method 400, another repetition time gap duration, dx2, also referred to herein as dy, is configured based on the detected or determined feedback following a repetition set based on a feedback policy. The other intra-repetition set time gap duration dy separates adjacent or sequential repetitive transmission occasions in at least one following repetition set in the configured grant period. The duration dy may be shorter, longer, or the same duration as the duration, of the inter-repetition set time gap between adjacent repetitive transmissions, dx, of the repetition set(s) transmitted in that configured grant period prior to the feedback being received.

The configured grant which initially signalled the use of resources for repetitive transmissions occasions over each configured grant period can be replaced, updated or aborted depending on what feedback is received during each intra-repetition set time gap, in otherwise, during any periods where the repetitive transmissions are suspended. One (or more) feedback policies may be used in any given configured grant period to determine how any explicit or implicit feedback received during an intra-repetition set time gap is to be processed. This means that feedback received during each interval of time (i.e. the duration of) dz in which repetitive transmissions are suspended in each configured grant period, can determine if any repetitive transmissions are resumed or not, and if they are resumed, if they have the same time gap duration dx or another time gap duration dy between each repetitive transmission and/or if the inter-repetition set time gap duration dz is to change as well.

In some embodiments of method 400, the received signalling further configures one or more or all of the following configuration parameters for the radio resources for each of the at least one configured grant periods for which signalled was received: a number of transport blocks or feedback processes which can be suspended in that configured grant period; a maximum number of time gaps during which transmissions of each transport block or feedback process in that configured grant period are suspended; a maximum number of repetitions, K, in a repetition set; and a redundancy version, RV, sequence for each repetition set in that configured grant period.

In some embodiments of method 400, the selected configuration of radio resources comprises dedicated radio resources for at least one repetition set and shared radio resources for at least one other repetition set. The shared radio resources may be shared with one or more other wireless communication devices which form a group of wireless communication devices in some embodiments.

In some embodiments of method 400, the method 400 further comprises detecting, by the wireless communications device, feedback received during an inter-repetition set time gap in one of the at least one configured grant periods; and based on the detected feedback, resuming or skipping one or more remaining repetitions using the selected resources in that configured grant period in accordance with a feedback policy.

In some embodiments of method 400, the feedback policy determines one or more characteristics of one or more subsequent repetition sets in the at least one configured grant period depending the detected feedback meeting one or more feedback conditions. In some embodiments of method 400, the feedback policy includes a feedback condition which must be met by feedback received by the wireless communications device if the wireless communications devices is to resume repetitive transmissions in another repetition set of that configured grant period or of a different configured grant period. In some embodiments of method 400, the feedback policy determines a repetition time gap duration dy between adjacent repetitive transmissions of a repetition set in the same or a different configured grant period which follows the received feedback; and/or wherein the feedback policy determines a subsequent repetition set time gap duration dz between adjacent sets of repetitive transmissions in the same or a different configured grant period which follows the received feedback.

In some embodiments of method 400, different feedback policies may be configured for different repetition sets in at least one configured grant period.

In some embodiments of method 400, the feedback policy is a hybrid automatic repeat request, HARQ feedback policy. In some embodiments, the feedback policy suspends processing HARQ feedback during the repetition set time gap of duration dz between two sets of repetitions. In some embodiments, the feedback policy includes an ACK feedback condition which is met if, during or after the repetition set time gap, ACK feedback is received for any previously transmitted repetitive transmissions of the transport block. The method 400 then further comprises, in response to determining the ACK feedback condition is met, the wireless communications device skipping transmissions using the remaining repetitive transmissions for that transport block.

In some embodiments of method 400, the feedback policy includes a NACK condition which is met if, during or after the repetition set time gap, an NACK is received for any previously transmitted repetitive transmissions of the transport block, wherein the method further comprises, in response to determining the NACK feedback condition is met, the wireless communications device resuming the remaining repetitive transmissions of the transport block until the next repetition set time gap occurs.

In some embodiments of method 400, the feedback policy includes a feedback condition which is met if, during or after the repetition set time gap, neither ACK feedback or NACK feedback is received for any previous repetitive transmissions of the transport block, wherein the method further comprises, in response to determining the feedback condition is met, the wireless communications device resuming repetitive transmissions of the transport block until the next repetition set time gap starts.

In some embodiments of method 400, the feedback policy determines if the wireless communications device resumes repetitive transmissions using a different redundancy version to the redundancy version of previous repetitive transmissions.

In some embodiments of method 400, at least some of the repetitive transmission occasions for a transport block use resources allocated using a dynamic grant, DG, process. The DG provides support for additional flexible transmissions in a configured grant, for example, by enabling additional or replacement repetitive transmissions to be made within a configured grant period.

In some embodiments of method 400, the radio resources are radio resources in a radio access network 100 such as, for example a LTE, 5G or 6G or future radio standards with the functionality to support a grant configuration of at least two different time gaps in each grant period between repetitive transmission occasions so that the repetitive transmissions are dispersed with each grant period.

The signalling which is received 402 is from a network node 120 as described herein, for example, with reference to FIGS. 1, 2b and 3, and which is configured to provide the signalling to wireless communication devices 110 in radio access network 100.

The example embodiments of the method 400 disclosed herein may also further comprise: providing user data; and forwarding the user data to a host computer via transmission to a network node 120 configured to provide base station functionality to the wireless communications device 110.

Figures 5A, 5B:
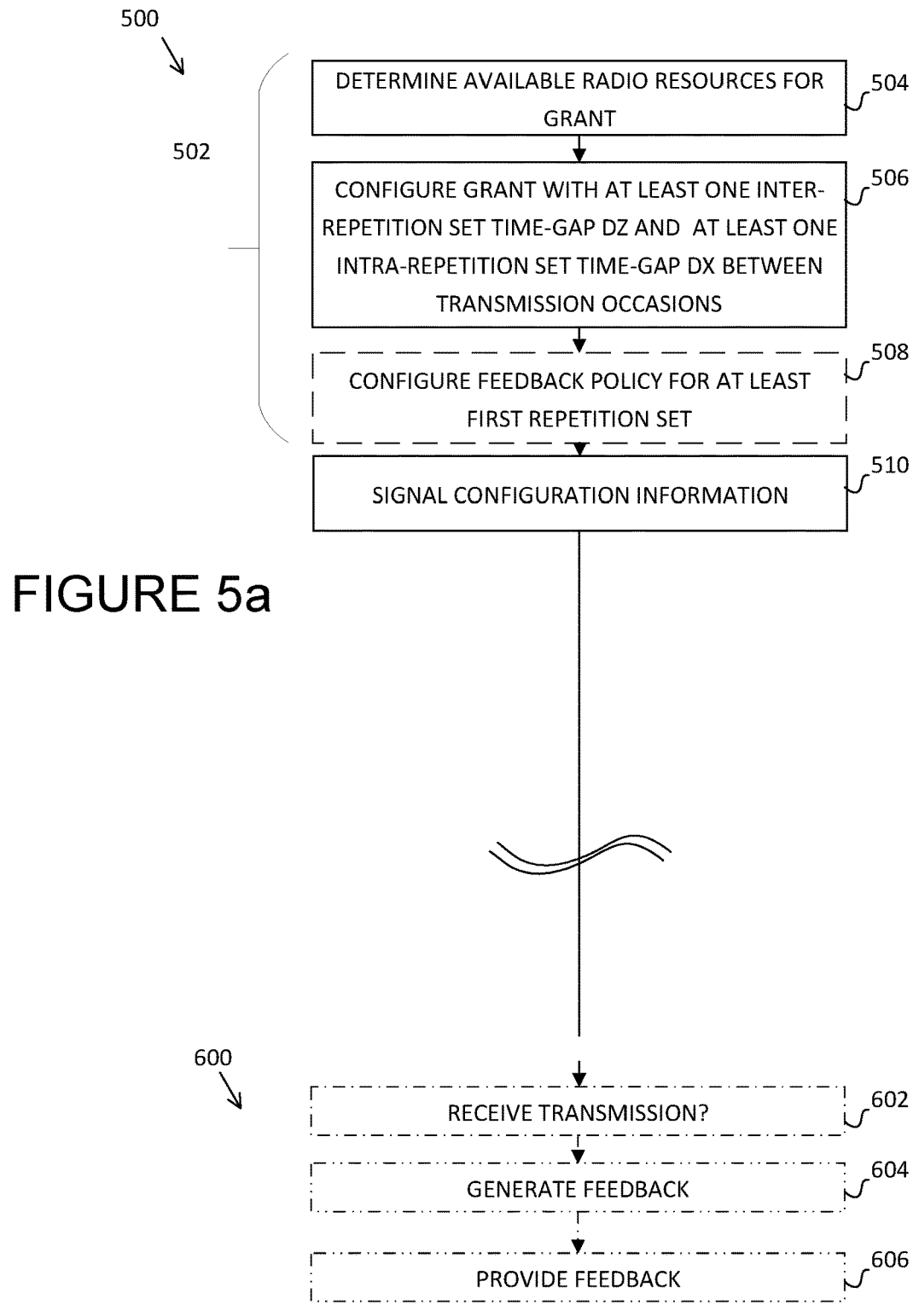
FIGS. 5a and 5b illustrates schematically example embodiments of methods performed by a network node according to the disclosed technology.

Examples of the network node 120 includes the examples shown schematically in FIG. 3 (and FIG. 2a) of the accompanying drawings which are configured to implement network node 120 which is configured to implement one of the disclosed embodiments of a method 500 for allocating a configured grant of radio resources for UL-TOs to one or more wireless communications devices 110 and/or method 600 (see FIGS. 5a and 5b)

A network node 120 may provide the signalling to the wireless communication device 110 as part of providing base station functionality in some embodiments. In some embodiments, the signalling is received as feedback from a gNB network node 120 configured to provide base station functionality in a 5G or 6G or subsequent radio access network, for example, a gNB network node 120 as shown schematically in FIG. 3.

Some embodiments of network node 120, such a gNB, perform a method 500 for allocating a configured grant of radio resources for UL-TOs to one or more wireless communication devices 110 in a NR-RAN 100. The network node 120 may be a network node or component configured to provide functionality similar to base station functionality or a base station in a wireless communications access network to a plurality of wireless communications devices 110, such as that shown in FIG. 5a of the drawings. The network node 120, for example, may comprise a network node providing base station functionality or a base station, in a radio access network, wherein the network node is configured to grant radio resources to a plurality of wireless communications devices 110. Some embodiments of the method 500 comprise the network node obtaining 502, for example, by generating or receiving, signalling information, indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and sending 510 to at least one of the plurality of wireless communications devices 110 over the radio access network, the obtained signalling information. In some embodiments, The signalling indicates in some embodiments at least one configuration of radio resources for a plurality of repetition sets comprising the time-domain repetitive transmissions in at least one configured grant period, and the other time-gap between the repetitive transmissions comprises an intra-repetition set time gap with a duration dx between repetitive transmissions of a repetition set. In some embodiments, the at least one time-gap comprises an inter-repetition set time gap of duration dz which follows at least the first repetition set of the at least one configured grant period.

The method 500 comprises in some embodiments at least obtaining, for example, by receiving or generating, 502 signalling information indicating at least one determined

504, 506 configuration of radio resources for a plurality of repetition sets comprising UL TOs in at least one configured grant period, each repetition set comprising time-domain UL-TOs for repetitive UL transmissions and a configuration of at least one inter-repetition set time gap with a duration, dz, to follow at least the first repetition set of a configured grant period and at least one intra-repetition time gap with a duration dx between the repetitive transmissions of at least the first repetition set in the configured grant period. The method 500 also comprises sending the obtained 510 signalling information to at least one of the plurality of wireless communications devices over the wireless communications access network.

In some embodiments, the method 500 also configures 508 a feedback policy for any feedback which may be received during the intra-repetition set time gap duration dz. However, in some embodiments, a feedback policy may be provided instead to replace or update an earlier feedback policy with the feedback provided during an intra-repetition set time gap duration dz.

In some embodiments of method 500, the processes shown in 502 in FIG. 5a provide a plurality of grant configuration parameters. In some examples of method 500, some, or none of the grant configuration parameters are explicitly signalled if they may belong to a set of grant configuration parameters accessible on the wireless communications device which are associated with a grant configuration index or other grant configuration identifier. In this type of embodiment, the signalling instead communicates the configuration index or other grant configuration identifier for the set of grant configuration parameters which that wireless communications device then uses for the one or more configured grant periods. As a minimum requirement, the grant configuration parameters included or indicated by the signalling comprise at least one intra-repetition set time gap, dx, between the transmission occasions forming a repetition set and at least one inter-repetition set time gap duration, dz, having a longer duration than the intra-repetition set time gap duration dx. In some embodiments, the signalling indicates a configured grant period includes two or more repetition sets. In some embodiments, a configured grant period includes at least two different intra-repetition set time gaps which have different durations dz1 and dz. In some embodiments, the configured grant instead or in addition provides for a plurality of different intra-repetition set time gaps of durations dx1, dx2 (shown as dy in FIGS. 7 and 8b). In some embodiments, the duration dx of the inter-repetition set time gap between adjacent repetitive transmission occasions increases with each repetition set in the configured grant period.

In some embodiments of method 500, the grant configuration parameters are generated by the network node 120 and included in signalling information. Some examples of grant parameters include a grant parameter which indicates a number of transport blocks or feedback processes for which repetitive transmissions can be suspended in a configured grant period. In other words, there may be a limit imposed on the number of repetition sets in a configured grant period by configuring how many times in a configured grant period uplink transmissions or feedback processes can occur.

In some embodiments of method 500, the generated signalling information indicates a maximum number of repetition sets a configured grant period, which also indicates the maximum number of times processing a feedback process can be are suspended in a configured grant period. In some embodiments of method 500, a grant parameter indicates a maximum number of repetitive transmissions, K, in a repetition set. In some embodiments, a grant parameter indicates a redundancy version, RV, sequence for each repetition set in a configured grant period. In some embodiments, one or more or all of the above grant configuration parameters are provided in the signalling information 502 of an embodiment of method 500 (performed by a network node) and are received as signalling information 402 of an embodiment of method 400 when performed by any of the disclosed embodiments (including aspects) of a wireless communications device or a UE.

The signalling generated by the network node 120 and received by a wireless communications device 110, comprises at least one of the following: system information signalling; dedicated radio resource control, RRC, signalling; media access control, MAC, control element, CE, signalling; and downlink control information, DCI, signalling. In some embodiments, the physical downlink control channel, PDCCH is used for communicating the signalling information which can be carried as downlink control information, DCI, to a wireless communications device 110. However, the physical downlink shared control channel, the PDSCH may be used for communicating the signalling to a wireless communications device 110 in other embodiments.

In some embodiments of method 500, the signalling sent 508 includes a feedback policy for feedback received by the wireless communications device for a repetition set differs for different repetition sets. In other words, the feedback policy is not uniform for all repetition sets in the same configured grant period in some embodiments and different feedback policies can be applied to different repetition sets. The signalled feedback policy may be configured to include at least one rule or condition for resuming any remaining repetitive transmissions in at least one other repetition set of the same or another configured grant period or another configured grant. The signalled feedback policy may be sent as part of the signalling 502 or later sent as feedback. The signalled feedback policy in either case can be configured so a feedback policy configured for at least one repetition set which is different from a feedback policy configured for at least one other repetition set in a configured grant period. In some embodiments, a feedback policy is signalled which is configured to selectively enable or disable whether one type or more types of all feedback is receivable by the wireless communications device during a repetition set time gap.

The signalling may indicate instead an index or reference which can be used by the receiving wireless communications device 110 to retrieve from a memory 210 one or more feedback policies to apply to one or more of the configured grant periods for which the signalling has provided configured grant information.

In some embodiments, the network node 120 which performs method 500 is a gNB network node, for example, a gNB 120 configured to provide base station functionality to a wireless communications device 110 in a NR-RAN 100. In some embodiments, one configuration is signalled by a gNB. In some embodiments, one configuration is allocated by multiple signalling by the gNB. In some embodiments, resources for n repetitions are allocated by multiple signalling for multiple grant configurations.

In some embodiments of method 500, the signalling information indicates or configures dedicated radio resources to be used for the at least one or all of the at least one repetition set of the configured grant period.

In some embodiments of method 500, the signalling information indicates or configures shared radio resources to be used for at least one or all of the at least one repetition set of the configured grant period by a group of wireless communication devices 110.

In some embodiments of method 500, the method further comprises wireless communications device the network node signalling to a group of wireless communication devices, a configuration or indication of at least some dedicated radio resources for at least one repetition set transmitted by a wireless communication device (110) of the group of wireless communication devices in a configured grant period and a configuration or indication of at least some shared radio resources for at least one other repetition set in the configured grant period for shared use by that wireless communication device with the other wireless communication devices in the group.

The disclosed embodiments of the second aspect such as method 500 which a network node 120 performs to provide signalling information to a wireless communications device 110 and the disclose embodiments of the method of the first aspect such as method 400 which the wireless communications device 110 performs using the signalled information provided from such a network node may comprise complimentary features in some embodiments, unless such features are indicated as optional features. Features of the embodiments disclosed in the context of either the first method aspect such as method 400 or the second method aspect such as method 500 are accordingly also to be considered as disclosures of the complimentary feature in the other method where this is appropriate and when this would be apparent to someone of ordinary skill in the art to do so. In addition, unless it is clearly stated not to be the case, in some embodiments, references to signalling information for a configured grant should be considered to comprise the information being used to look up one or more or all of the grant configuration parameters and/or the information conveying one or more or all of the grant configuration parameters for the one or more configured grant periods.

Some embodiments of the feedback policy provide rules for explicit and/or implicit feedback. For example, reception of new grant during an intra-repetition period for same HARQ process can be understood as an implicit NACK. As another example, reception of new grant for new HARQ process received during an intra-repetition period can be understood as an implicit ACK. In some embodiments, a HARQ feedback policy includes rules for HARQ feedback which is implicitly provided by the gNB network node to the wireless communications device.

The suspension of the repetitive transmissions which are separated by the intra-repetition set time gap duration dx is signalled to begin directly following the last transmission occasion in the last repetition set in some embodiments, meaning the total suspension of repetition transmissions cannot last longer than the signalled intra-repetition set time gap duration dz. However, it is possible as an alternative that the signalled inter-repetition set time gap duration dz is contiguous and carries on from the last intra-repetition time gap dx, meaning the total time that could elapse before the next embodiment could be the combined duration dx+dz of both time gaps.

The suspension of the repetitive transmissions need not be for the full configured duration dz of an inter-repetition set time gap. Whether the suspension of transmissions is for the entirety or just part of a repetition set time gap may be dependent on feedback received by the wireless communications device during that repetition set time gap or, alternatively, on feedback received during a previous repetition set time gap of duration dz but not actioned until later during the subsequent repetition set time gap. In some embodiments, at least one other repetition set time gap is configured to follow at least one other repetition set. In some embodiments, the at least one other repetition set time gap has a different duration to the repetition set.

FIG. 5b shows schematically a method 600 that a network node 120 might later perform to provide feedback to a wireless communications device 110 in some embodiments of the disclosed technology. The network node 120 which performs method 600 as shown in FIG. 5b is the network node 120 that performed method 500. Sometime after network node 120 has sent 510 signalling indicating an allocated grant configuration of radio resources to wireless communications device 110, the network node 120 receives 602 a transmission from the wireless communications device 110, and generates feedback 604 which is then sent to the wireless communications device 110. In the illustrated embodiment of method 600, after a network node 120 has received 602 at least one transmission using a previously configured transmission occasion from the wireless communications device 110, it generates 604 feedback using its own feedback policy and sends 606 this back to the wireless communications device 110. In some embodiments, the feedback generated 604 includes a feedback policy for the wireless communications device 110 to implement for the feedback received. In some embodiments, the feedback policy was sent in the signalling 510 performed by that network node or another network node.

In some embodiments of the method 500 disclosed herein, the method further comprises: obtaining user data; and forwarding the user data to a host computer or a wireless communications device 110.

Figures 6A, 6B:
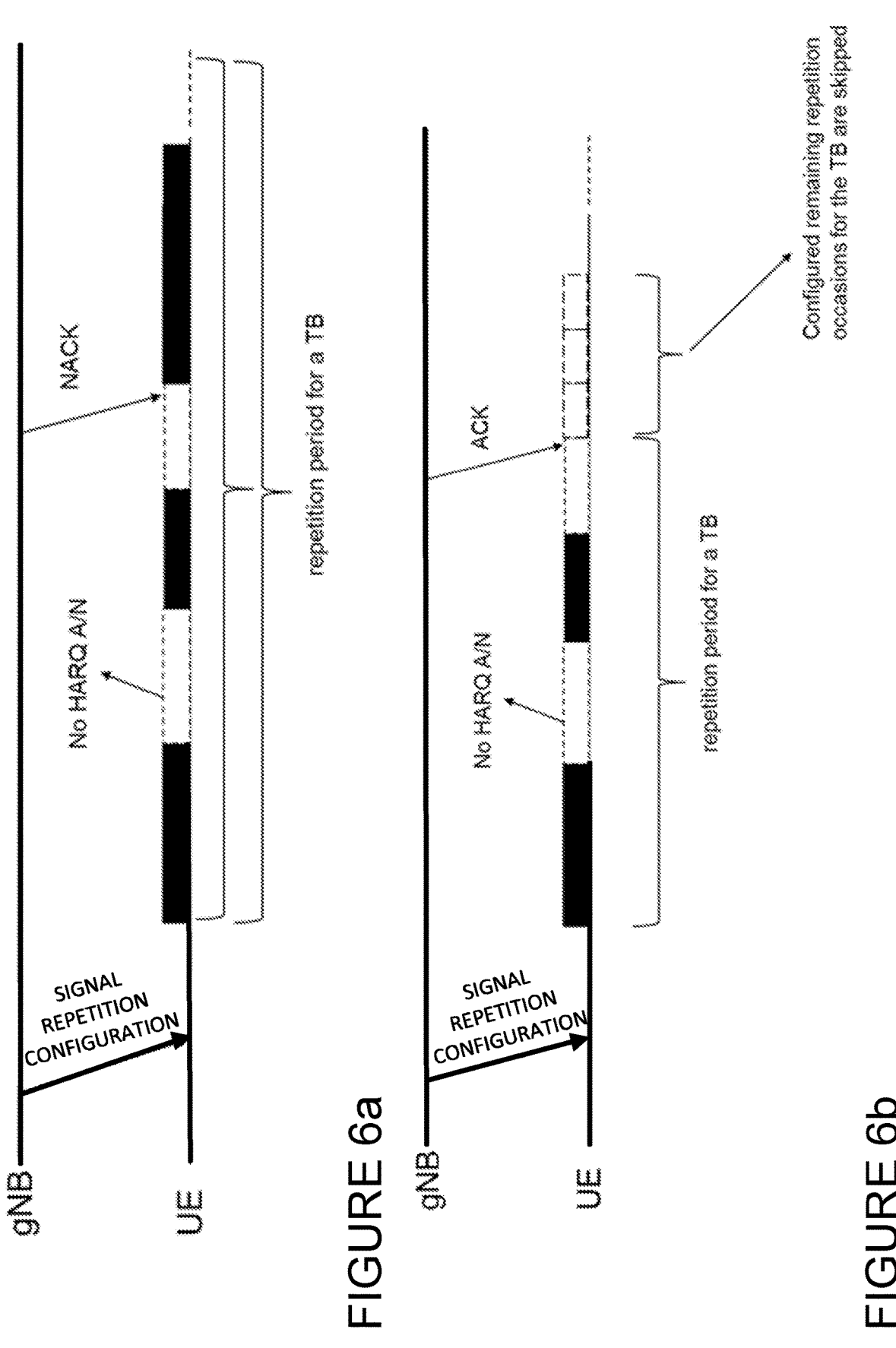
FIG. 6a illustrates schematically an example of how feedback is handled by a wireless communications device according to some embodiments of the disclosed technology.
FIG. 6b illustrates schematically another example of how feedback is handled by a wireless communications device according to some embodiments of the disclosed technology.

FIGS. 6a and 6b illustrate schematically the way that signalling information for a repetition configuration allows the feedback sent 606 of FIG. 6 from a network node 120, for example a gNB as shown in FIGS. 6a and 6b, to be received by a wireless communications device 110, for example, a user equipment UE as shown in FIGS. 6a and 6b. In the following description of the embodiments shown in FIGS. 6a and 6b, references to a gNB 120 and to a UE 110 should be considered to be exemplifying references to any suitable network node 120, for example, to a network node according to the fourth aspect and to any suitable wireless communications device 110, for example to a wireless communications device according to the third aspect or to a UE according to the fifth or eight aspects disclosed herein.

In FIG. 6a, gNB 120 signals an indication of radio resources for repetitive transmission occasions in a configured grant period for transmitting a transport block, TB, to a UE 110 which indicates two different types of time gaps to be used to disperse repetitive transmissions in configured grant period. An intra-repetition set time gap duration dx is used to uniformly separate each repetitive transmission occasion in a repetition set of repetitive transmissions. An inter-repetition set time gap duration dz separates each the repetition set of repetitive transmissions in the configured grant period.

As shown in FIG. 6a, the gNB 120 sends signalling information to the UE 110 which configures two inter-repetition set time gaps of duration dz during which there are no repetitive transmissions and the UE 110 is accordingly capable of receiving and potentially acting on feedback provided by the gNB. In FIG. 6a for clarity, each set or burst of repetitive transmissions is shown as a black rectangle and each repetition set time gap duration dz as a blank white rectangle along a horizontal time-axis where time increases from left to right. In FIG. 6a, during the first inter-repetition set time gap duration dz, no feedback is received. In this example, the feedback policy being implemented is a hybrid automatic repeat request, HARQ, feedback policy. The absence of any HARQ feedback in the first inter-repetition set time gap duration dz (also shown as HARQ A/N in FIG. 6b) is interpreted using the feedback policy for that configured grant and/or that inter-repetition set in that configured grant as an implicit NACK in some embodiments.

In some embodiments of the disclosed methods 500, 600 that the gNB 120 and the method 400 that the UE 110 respectively perform, a feedback policy is used that comprises rules which indicate what to do if there is no HARQ A/N feedback received in an intra-repetition set time gap duration dz. For example, the rules may indicate the same or different feedback rules from the rules which apply to any HARQ NACK received feedback. In embodiments where the feedback policy replicates the rules for a HARQ NACK as rules for the being no HARQ A/N feedback received, the feedback policy is assumed to have been provided as part of the signalling or otherwise previously provided to the UE 110 as it cannot be provided with any feedback as none was received. One example of such a rule for no HARQ A/N feedback being received indicates the UE is to resume repetitive transmissions using the configured transmission occasions of the next repetition set after that repetition set time gap in the configured grant period. The rules may also differ for different repetition set time gaps. In the example embodiment of a configured grant shown schematically in FIG. 6a, during the second inter-repetition set time gap duration dz2, a NACK is received. In this case, fore example, the rules of feedback policy determine the UE should resume the remaining repetitive transmissions in that configured grant period.

FIG. 6b shows schematically another example of a gNB allocating the same configured grant of radio resources to a UE as that shown in FIG. 6a. The features in FIG. 6b which are the same as the features are shown as in FIG. 6a will not have their description duplicated. The configured grant shown in in FIG. 6b, however, shows that instead of NACK feedback being received in the second inter-repetition set time gap duration dz, an ACK feedback is provided by the gNB. In this example embodiment, the feedback policy indicates that for ACK feedback received during that intra-repetition set time gap, the remaining repetitive transmission occasions for the transport block are to be skipped.

In some embodiments, a gNB provides HARQ feedback to a UE and the HARQ feedback is enabled or disabled in a flexible manner to include either or some or all feedback options—e.g., ACK, NACK, no feedback/response, dynamic grant, etc. For example, if HARQ feedback is disabled, then the UE does not receive any kind of feedback in a repetition set time gap during which the repetitive transmissions are suspended. In this case, after the suspension period, UE proceeds a-priori to transmit any remaining repetitions. In some embodiments, the gNB configures a number of configured grant parameters for one or more configured grant periods. Examples of the configured grant parameters which are configured include: a number of TBs and/or HARQ processes which are allowed to be suspended in any configured grant period; the duration of each intra-repetition set time gap; a maximum number of inter-repetition set time gaps of duration dz. In other words, a maximum number of allowed suspensions for a TB and/or HARQ process in the configured grant period; the total number of repetitions and a redundancy version, RV, sequence for each repetition set or burst of repetitions—which may be prior to the first inter-repetition set time gap duration dz suspending repetitions or between two time gaps each of duration dz or after the last time gap duration dz; and the timing gap duration dx between adjacent repetition occasions for each repetition set or burst. The configuration is signalled by the gNB to the UE via at least one of the below signalling means system information; dedicated RRC signalling MAC CE; DCI. In some embodiments, the repetitions for a TB are transmitted by the UE using a configured grant where the configuration of the parameters may be included in the RRC IE configured GrantConfig.

In some embodiments, some repetitions for a TB may be transmitted using a dynamic grant, DG provided in a configured grant period. A dynamic grant can thus to supplement a configured grant to provide additional repetitions in a current or a following configured grant period in some embodiments. In FIG. 7, the DG comes at the end to support retransmissions for the same HARQ process. These repetitions can be supplemental to the n-K repetitions of the original configured grant in some embodiments. The DG repetitions may be retransmissions which are part of the n-K repetitions in some embodiments. For example, if there are not enough repetition sets in a CG, some of the repetitions may be transmitted using a DG, or if time has run out or if two repetition sets are so far apart, in other words if duration dz is very long, then a DG may be provided between the repetition sets in order to transmit some extra repetitions.

In some embodiments, after each inter-repetition-set time gap duration dz, the way the UE handles the transport blocks which were suspended during the time gap duration dz depends on what feedback is received during the following time gap duration dz and a feedback policy which sets out rules for how the feedback is to be processed by the wireless communication device 110 or UE. In some embodiments, the feedback comprises a corresponding HARQ A/N for which the UE has three options to handle the suspended TBs.

In a first example of an option, if an ACK is received in the time gap duration dz following repetitive transmissions of a TB, the UE does not do the remaining configured K–X repetitions. In other words, the remaining configured repetition occasions for this TB are skipped. In a second example of an option, if a NACK is received following a set of repetitive transmissions of a TB, the wireless communications device 110 resumes the repetitive transmissions for the TB until the next inter-repetition set time gap starts for that TB. This option enables the gNB to improve the transmission reliability in the case where the gNB has already received at least some part of the TB, for example, from previous repetitions. In this case, after resuming repetitions for that partially received TB, the transmission reliability for the remaining part(s) of the TB can be improved. For example, the UE can apply different settings for the subsequent repetitions for improved transmission reliability. In an example, the UE can transmit repetitions using certain RVs (e.g., RV2, or RV4) to improve reliability of the transmissions or increase the reception gain. In a third example option, if no HARQ A/N is received following the repetitive transmissions of the TB, the UE resumes repetitions for the TB until the next suspension is initiated to the TB.

In some embodiments where no HARQ A/N is received, for example, such as can occur due to bad radio channel conditions or congestion in the RAN 100, the UE 110 can be configured to perform certain policies to improve the decoding probability for the gNB 120. For example, the UE 110 may resume repetitions using the same repetition configuration (e.g., repK and repRV) as in previous repetition burst. Alternatively, the wireless communications device 110 may resume repetitions using a different repetition configuration (e.g., repK and repRV) as in a previous repetition set or burst. For example, a wireless communications device 110 may use RV0 or RV3 to transmit repetitions.

Additionally, for any above alternative, the UE may use other transmission occasions to transmit the repetitions. The other transmission occasions may be provided in a next period, or in a different grant for the same period. For example, transmission occasions may be provided in a subsequent next CG period belonging to the same CG configuration, in other words the same signalled CG configuration is used for a plurality of CG periods. In some embodiments however, the other transmission occasions are provided in a new, different, signalled CG configuration. Where a configuration is dynamically granted, the other transmission occasions may be provided in another downlink control information DCI. The signalling provides at least one but may provide several repetition set time gaps duration dz which act as suspension periods for the repetitive transmissions. Each repetition set time gap duration dz provides a configured suspension period which is a maximum time period for a UE, to suspend the repetitive transmissions (also referred to here from time to time as repetitions).

During each time gap duration dz where the repetitive transmissions are suspended, if a UE 110 has obtained feedback, for example, HARQ ACK/NACK feedback for the corresponding transport block, the UE 110 can be configured via a feedback policy or otherwise to terminate the suspension of repetitive transmissions, i.e. terminate the time gap duration dz early without waiting for the full duration of the time gap period duration dz to expire. In some embodiments, the gNB 120, provides or signals a configuration to the UE during a repetition set time gap duration dz whilst the repetitive transmissions are suspended which means that one or more following repetitions burst then have a different configuration from the configuration of any preceding repetitions.

The different configuration received during a repetition set time gap may change one or more of the grant configuration parameters that the network node can configure, for example, one or more of: a number of TBs and/or HARQ processes which are allowed to be suspended in any configured grant period; the duration of each intra-repetition set time gap; a maximum number of inter-repetition set time gaps of duration dz; the total number of repetitions and a redundancy version, RV, sequence for each repetition set or burst of repetitions; and the timing gap duration dx between adjacent repetition occasions for each repetition set or burst. The changed grant configuration is signalled by the gNB to the UE using a suitable signalling process, for example, it may be signalled as system information, using dedicated RRC signalling, as media access control channel element MAC CE (for example if the access network 100 includes support for LTE network communications at the MAC layer); or downlink control information, DCI.

FIG. 7 of the drawings shows an example of a configured grant allocation for a transport block. In FIG. 7, a network node 120, for example, such as a gNB, is assumed to have performed an embodiment of method 500 to allocate a configured grant of radio resources to a wireless communications device 110, such as a UE. The configured grant allocation is for at least one transport block to use K repetitive transmission occasions for uplink transmissions of that at least one transport block. The signalling information configures or otherwise indicates that radio resources (which may be dedicated or shared) are available for a number, X, of repetitive transmission occasions which are separated by a first time gap of duration dx followed by an inter-repetition set time gap of duration dz.

In the example shown in FIG. 7, a feedback policy may also be used by the wireless communications device 110 which indicates if an ACK is received during the time gap duration dz, then the remaining (K–X) repetitions are to be skipped in that configured grant period. If, however, NACK feedback is received, during the inter-repetition set time gap or duration dz, the remaining K–X repetitions are to be resumed in that configured grant period, but now they are to be separated by a different intra-repetition set time gap duration dy instead of the intra-repetition set time gap duration dz. Time gap duration dy may be longer than duration dz in some embodiments. In some embodiments, not illustrated in FIG. 7, the process may repeat so that after X repetitions have been transmitted, there is another time gap duration dz, and if a NACK is received, then the feedback policy may indicate that the remaining K–2X repetitions are to resume. Eventually, if all of the K transmission occasions configured for repetitive transmission of a transport block in that configured grant period have been used and the wireless communications device 110 has still not received a dynamic grant DG with the grant period, then the feedback policy in this example considers an ACK to have been received, and a dynamic grant process occurs.

In one embodiment of a configured grant signalled by a network node 120, for example, such as a gNB to a wireless communications device 110, for example, such as user equipment, UE, and as shown in FIG. 7, the K repetitive transmission occasions configured are divided into two repetition sets. In this example embodiment, as FIG. 7 shows, the first set has X=2 repetitions. After X=2 repetitions, if feedback is received in time gap duration dz, comprising an ACK (an acknowledgement) (or if an implicit ACK is assumed to have been received based on a previously configured feedback policy), a feedback policy (which may have been previously configured or which is provided with the feedback) indicates the UE should not use the remaining K–X repetitions and terminates the configured grant early (see also FIG. 9). However, if after X repetitions a NACK is received, then the wireless communications device, for example, the UE, 110 will continue to use the remaining K–X repetitions which form the following repetition set. This means that if the network node 120, for example the gNB, has already received some part of the transport block(s) which were transmitted in the first set of repetitions, and the gNB wants to improve the reliability of the transmissions, it can do this by signalling during the first repetition set time gap duration dz to demand more repetitions of the transmissions in the second set. The wireless communications device, or UE, 110 then responds accordingly, for example, it can transmit using a different redundancy value, RV, in the second set to improve reliability of the transmissions, or to increase the gain.

If there is no feedback or response received the feedback policy may be used to define how the wireless communications device 110, for example, a UE, behaves within the remaining configured grant period. For example, one option is for the wireless communications device 110 to continue with remaining repetitions over K–X occasions. Alternatively, another option if no feedback is received during the inter-repetition set time gap duration dz, is for the wireless communications device 110 to wait until the next configured grant period. Another option when no feedback is received is for a wireless communications device 110 to transmit with a different RV pattern in K–X occasions than it would have done if it had received a NACK. For example, the wireless communications device 110 can K–X repetitions with RV0 or RV3 or self-decodable repetitions. It is also possible for example, for any of the three categories of different feedbacks, name, the ACK feedback, the NACK feedback, and the no feedback/response to be enabled or disabled. In other words, in some embodiments, the network node 120, for example, the gNB 120, can configure the wireless communications device 110, for example, UE 110, to receive either ACK feedback or no feedback but disables the UE from receiving NACK.

In the example embodiment illustrated in FIG. 7 where the second repetition set has K–X repetition occasions, after doing K–X repetitions, an example feedback policy which can be applied based on the ACK or NACK received during the inter-repetition set (in the illustrated embodiment, the feedback takes the form of a 1-bit ACK or 1-bit NACK but a different format for ACK or NACK may be used in other embodiments). In some embodiments, when autonomous retransmission is not enabled at the wireless communications device 110, then if the configured grant timer, CGT, expires, then that current HARQ process will terminate and an implicit ACK is assumed. If autonomous transmission is enabled at the wireless communications device 110, a dynamic grant, DG, is provided to schedule either a new transmission or a retransmission associated with the same HARQ process of the transport block repetition.

In some embodiments, when autonomous retransmission is enabled at the wireless communications device 110, then if the CGT expires, the wireless communications device 110 stops autonomous retransmissions for that transport block and clears the HARQ buffer, otherwise if autonomous retransmission if not enabled, an implicit ACK is provided to the wireless communications device 110 before the expiration of the CGT.

The disclosed examples of network nodes 120 such as, for example, the gNB 120 shown in FIG. 3, disperse the CG repetitions within the configured grant period by signalling a plurality of different time gaps. FIG. 7 shows these schematically as i) a time gap among repetitions in the first set, dx, which is also referred to herein as an intra-repetition set time gap dx, ii) another intra-repetition set time gap of duration dy among repetitions in the second set, where the duration of dy is different from the duration of dx; and iii) a different, longer time gap of duration dz between the last repetition of first set (i.e., the X-th repetition) and the first repetition of the second set (i.e., the X+1-th repetition), which is also referred to herein as an inter-repetition set time gap duration dz, i.e. a time gap of duration dz. It is also possible to have two repetitions back-to-back by setting the inter-repetition set time gap duration dz to zero. In this example embodiment, the gNB signals via DCI, or RRC, or a combination of both, the grant configuration parameters, such as the values of X and K, and the durations of dx, dy, dz, and the type or kind of feedback policy or policies to be applied after first set (X repetitions) and second set (K–X repetitions). As mentioned previously, although only two sets are shown in FIG. 7, the signalling may allocate a configured grant with a different number of N sets, in which case the total number of transmission occasions K will be spread over these N sets. The number of repetitions in each repetition set may be uniform in each configured grant period or may differ. Some embodiments of the feedback policy for a configured grant allocation indicate if a wireless communications device 110, for example, the UE receives an ACK after first set of repetition, that the UE is allowed to transmit another HARQ process in the second repetition set.

Some embodiments of the feedback policy for a configured grant allocation such as that shown in FIG. 7 indicates if a UE receives ACK after a first repetition set, then the gNB is to release the resource retained in the grant configuration for the second repetition set so this is no longer available to that UE. Some embodiments of the feedback policy for a configured grant allocation indicate if a UE receives NACK after first set of repetition, then UE can be allowed to transmit another HARQ process in the second set with uplink control information UCI included to indicate that this HARQ process in the second set is different from first set.

Figures 8A, 8B:
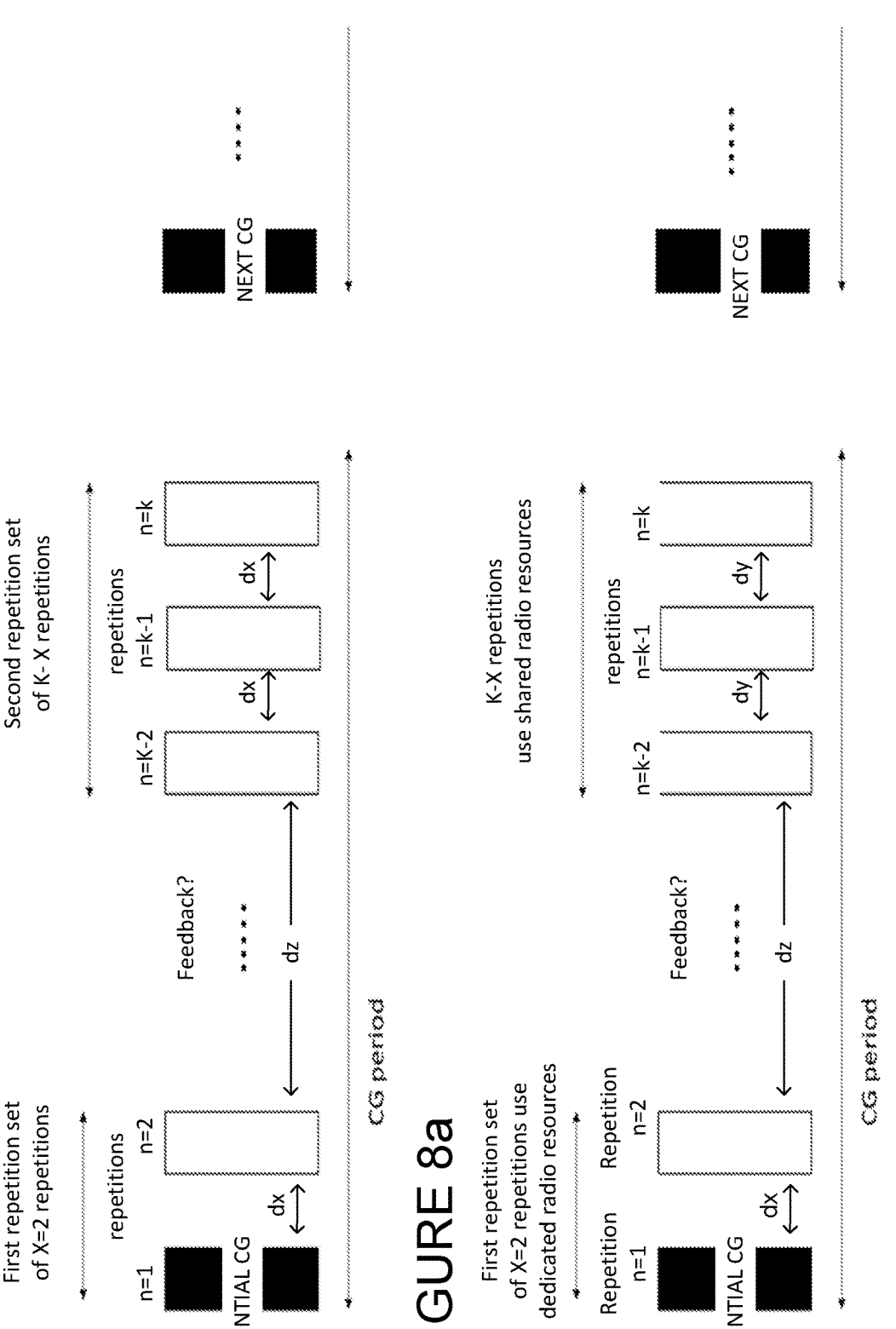
FIG. 8a illustrates schematically an example of how repetitions can be transmitted for a plurality of consecutive grant periods according to an embodiment of the disclosed technology.
FIG. 8b illustrates schematically another example of how repetitions can be transmitted for a plurality of consecutive grant periods according to an embodiment of the disclosed technology.

FIGS. 8a and 8b show other examples of configured grants which may be signalled by a network node 120, such as a gNB, to a wireless communications device 110 such as a UE. In FIG. 8a, the signalling sent 502 of method 500 is assuming to have indicated K transmission occasions were allocated for use by the wireless communication device or UE in the grant configuration period which could be used for repetitive uplink transmissions of one or more transport blocks to that network node or gNB 120.

FIG. 8a shows schematically how the signalling configures K repetitions in the form of two repetition sets, each using an intra-repetition set time gap of duration dx between the repetitive transmission occasions. In FIG. 8a, the first repetition set comprises two repetitive transmissions separate by a time gap dx, and the second repetition set comprises three repetitive transmission occasions which are separated by the same time gap dx. The two repetition sets are separated by the inter-repetition set time gap duration dz. The signalling generated 502 may allocate resources for just one configured grant period or for a sequence of configured grant periods in some embodiments. In FIG. 8a, if the UE 110 receives an ACK after a CG transmissions with n<K repetitions, it can uses the n+1 repetition occasion as a new HARQ process by indicating a redundancy version such as RV0 or RV3 or some new data indication in the uplink control information which is appended to the uplink transmission or in a MAC header. Thus in FIG. 8a, after repetition n=2, the UE receives an ACK, and then sends a new initial TB (a new CG period) with a new RV. The gNB receiving the transmissions after this assumes the following K CG transmission is in fact a new CG period with K new repetitions unless the UE indicates a new HARQ process. This means the CG pattern starts over again but with a new HARQ.

FIG. 8b schematically illustrates how both dedicated and shared radio resources may differ within a configured grant period as well as the duration of the intra-repetition set time gaps dx, dy. In contrast to the example embodiment shown schematically in FIG. 8a, in FIG. 8b the signalling for the allocated grant has configured the transmission occasions for repetitive transmissions in the second repetition set to be separated by a different time gap dy, which may be longer or shorter than the first intra-repetition set time gap dx. The signalling received for the initial configured grant may also, in some embodiments, configure and allocate resources for one or more subsequent configured grant periods, shown as next CG, in FIG. 8b, for one or more transport blocks. The signalling may allocate different types of radio resources to be used by the repetitive transmissions forming each repetition set, for example, as shown in FIG. 8b, the repetitive transmission occasions n=1, n=2 of the first repetition set use dedicated radio resources whereas repetitive transmission occasions in the subsequent repetition set use shared radio resources.

In the disclosed embodiments of the methods 400 performed by the wireless communications device 110 and the methods 500, 600 performed by the network node 120 respectively, a repetition set comprises a plurality of consecutive time-domain repetitive transmission occasions which can be collectively transmitted or suspended together. A repetition set time gap thus delineates between the repetitive transmissions in a repetition set from those of an adjacent (in the time domain) repetition set. The repetitive transmissions within the same repetition set use the same frequency domain resources. In some embodiments, within the same configured grant period, some repetition sets may use dedicated radio resources and others may use shared radio resources.

FIGS. 7, 8a and 8b illustrate examples only of grant configurations which may be provided by embodiments of the methods 400, 500, 600 performed respectively by a wireless communications device 110 and a network node 120, in which the signalling indicates a maximum number of repetitions, K, is configured for each configured grant period. In some embodiments of these methods, the repetition time gap duration, in other words, the intra-repetition set time gap, dx, is configured between adjacent repetitions of all of the repetition in a configured grant period. The number of repetitive transmissions forming each repetitive transmission sets may vary in some embodiments, such as FIGS. 7, 8a and 8b show, whereas in other embodiments, each repetition set comprising the same number X of repetitions, where X is less than K, in a configured grant period.

In some embodiments, when the first repetitive transmission occurs in each repetition set is configured to vary within the configured grant period, for example, by varying the start of the first transmission occasion in the first repetition set or by varying the inter-repetition set time gap dz. This could enable a network node to better manage the usage of dedicated and/or shared radio resources in the access network by a large number of devices. In some embodiments of the method, the signalled configured duration dz of at least one repetition set time gap varies in the configured grant period. In other words, some embodiments, a plurality of configured durations dz1, dz2, . . . dzk are configured to follow the repetition sets respectively within the configured grant period. It is also possible to modify the maximum number of repetitions in each repetition set. In some embodiments, the duration dz of at least one repetition set time gap is set to zero.

In some of the above embodiments of the methods of sending signalling for a grant configuration for a transport block 500 or of receiving signalling for a grant configuration for a transport block 400, such as FIGS. 7, and 8b exemplify, another repetition time gap duration, dy, is configured between adjacent repetitive transmissions of at least one other repetition set in the configured grant period, where the duration dy is different from the duration, dx of the first repetition set. In other words, in some embodiments, the intra-repetition time gap duration dx for each set of repetitions of any one of the repetition sets can differ, but will be the same for all of the repetitions in any one of the repetition sets. The configured inter-repetition set time gap configured duration, dz, is longer than the configured duration dx or dy of any repetitive time gap between adjacent repetitive transmissions of a repetition set in the configured grant period so as to allow for feedback to be received and also to further disperse the use of the radio resources over the duration of the configured grant period.

In some embodiments, a duration of a suspension, in other words, the duration of the intra-repetition set time gap dz, is configured by considering the time needed by a gNB to process a TB and/or generate corresponding HARQ feedback. In some embodiments, HARQ A/N is provided by the gNB to the wireless communications device 110 such as a UE, explicitly or inexplicitly. When inexplicit HARQ A/N for a TB is provided, the UE relies on a timer or reception of a grant associated with the same HARQ process which is being occupied by the TB. For example, a timer can be started after transmission of a TB. This means a NACK after expiry of the timer however is received and UE doesn't receive explicit HARQ A/N for the TB while the timer is running. For example, an ACK may be considered implicit if a grant indicating a new transmission associated with the HARQ process which is being occupied by the transmission block is received. A NACK may be considered implicit if a grant indicating a retransmission associated with the HARQ process which is being occupied by the transport block is received.

The disclosed embodiments provide a wireless communications device or UE 110 with a capability to suspend repetitive transmissions for a transport block. After a configured time gap duration dz during which repetitive transmissions are suspended, the wireless communications device or UE 110 is able to either resume repetitive transmissions for the transport block if there is no positive feedback such as an ACK received or skip the remaining repetition occasions if positive feedback such as an ACK is received.

In some embodiments of methods 400 or 500, the signalling configures one or more of the following configuration parameters for the radio resources for a configured grant period: a number of transport blocks or feedback processes which can be suspended in that configured grant period; a duration of each time gap dx, dy, dz, in that configured grant period; a maximum number of time gaps of duration dx, dy, dz, for each transport block or feedback process in that configured grant period; a maximum number of repetitions, K, in a repetition set and a redundancy version, RV, sequence for each repetition set in that configured grant period. In some embodiments, however, the signalling may indicate only a duration of a time gap, dx, between adjacent repetition occasions for each repetition set in that configured grant period and a duration of a time gap duration dz between repetition sets.

In some embodiments of methods 400 or 500, the signalling provides configuration parameters which configure a repetition time gap duration, dx, between adjacent repetitive transmissions in a first repetition set of the configured grant period and/or configuration parameters for at least one different time gap duration, dy, between adjacent repetitive transmissions in at least one other repetition set of that configured grant time period.

In some embodiments of methods 400 or 500, the configuration parameters are signalled by the network node 120 to the wireless communications device using at least one of the following: system information signalling; dedicated radio resource control, RRC, signalling; media access control, MAC, control element, CE, signalling; and downlink control information, DCI, signalling. In some embodiments, the dedicated RRC signalling information element, IE, includes the configuration parameters.

One example embodiment of a feedback policy which an embodiment of method 500 may provide or which an embodiment of method 400 may utilize, determines one or more characteristics of one or more subsequent repetition sets in the at least one configured grant period depending the detected feedback meeting one or more feedback conditions. This enable a transmission characteristics, such as, for example, the reliability or priority of a previous transmission set to affect the reliability or priority used for subsequent repetition sets. The feedback policy can include a feedback condition which must be met by feedback received by the wireless communications device if the wireless communications devices is to resume repetitive transmissions in another repetition set of the configured grant period or of a different configured grant period. The intra-repetition time gap duration dy and/or the inter-repetition set time gap duration dz between adjacent repetitive transmissions of a repetition set in the same or a different configured grant period which follows the received feedback is changed in accordance with the feedback policy in some embodiments. In some embodiments, different feedback policies are configured for different repetition sets in the same configured grant period. For example, in some embodiments, the selected configuration of radio resources comprises dedicated radio resources for at least one repetition set and the feedback policy may indicate that shared radio resources at to be used depending on the type of feedback determined during a time gap duration dz in at least one remaining repetition set of that configured grant period.

In some embodiments of the feedback policy, the feedback policy configuration is provided by signalling comprising at least one of: downlink control information, DCI, signalling; and radio resource control, RCC, signalling. In some embodiments, the feedback policy is a hybrid automatic repeat request, HARQ, feedback policy. The feedback policy suspends processing HARQ feedback during the inter-repetition set time gap of duration dz between two sets of repetitions. The detected feedback may be explicit or implicitly derived as a result, for example, of not receiving signalling for a new CG.

In some embodiments the feedback policy comprises a HARQ feedback policy which includes at least the following: an ACK feedback condition which is met if, during or after the repetition set time gap, ACK feedback is received for any previously transmitted repetitive transmissions of the transport block, and wherein the method further comprises, in response to determining the ACK feedback condition is met, the wireless communications device skipping transmissions using the remaining repetitive transmissions for that transport block. The HARQ feedback policy also includes at least the following: a NACK condition which is met if, during or after the repetition set time gap, an NACK is received for any previously transmitted repetitive transmissions of the transport block, wherein the method further comprises, in response to determining the NACK feedback condition is met, the wireless communications device resuming the remaining repetitive transmissions of the transport block until the next repetition set time gap occurs. The HARQ feedback policy also includes at least the following: a feedback condition which is met if, during or after the repetition set time gap, neither ACK feedback or NACK feedback is received for any previous repetitive transmissions of the transport block, wherein the method further comprises, in response to determining the feedback condition is met, the wireless communications device resuming repetitive transmissions of the transport block until the next repetition set time gap starts.

Some embodiments of the feedback policy indicate feedback is implicitly provided by an expiry of a timer indicating an ACK or a NACK. In some embodiments, feedback is provided by reception of a new grant indicating transmission occasions for a new configured grant period (implicit ACK).

In some embodiments, the feedback policy determines if the wireless communications device resumes repetitive transmissions using a different redundancy version to the redundancy version of previous repetitive transmissions. In some embodiments, the different redundancy version increases at least one of: a reception gain of the remaining K–X repetitive transmissions; and a reliability of the transmission of the remaining K–X repetitive transmissions In some embodiments, the feedback policy determines if the wireless communications device resumes repetitive transmissions using a repetition time gap My which has the same duration or a different duration of the previous repetition set repetition time gap Ox.

In some embodiments, the feedback policy determines if, after a repetition set time gap, the wireless communications device resumes transmitting remaining repetitive transmissions using transmission occasions in the same configured grant period or a following configured grant period.

In some embodiments, a plurality of repetitive transmission occasions in the following grant period are provided in the signalled configuration for the configured grant period. In some embodiments, the repetitive transmission occasions in a following configured grant period are signalled as feedback in a current configured grant period. In some embodiments, repetitive transmission occasions in the following grant period are provided by dynamic grant signalling using different downlink control information to the downlink control information of the configured grant period (see FIG. 7 for example).

In some embodiments, the configuration of the duration of a repetition set time gap is based a length of time a gNB network node requires to process a received transmission from a repetition set from the wireless communications device, generate HARQ feedback, and transmit the feedback to the wireless communications device.

In some embodiments, HARQ feedback is explicitly provided by the gNB network node 120 to the wireless communications device 110. In some embodiments, HARQ feedback is implicitly provided by the gNB network node 120 to the wireless communications device 110. In some embodiments, the feedback policy is configurable to selectively enable or disable whether one type or more types of all HARQ feedback receivable by the wireless communications device during a time gap. In some embodiments, the intra-repetition set time gap indicates a maximum duration for the wireless communications device 110 to suspend transmitting repetitive transmissions for a transport block. In some embodiments, depending on a type of feedback has been received during a repetition set time gap and a feedback policy for that feedback, the wireless communications device resumes repetitive transmissions before the end of the repetition set time gap.

In some embodiments, depending on what type of feedback was received during a repetition set time gap and a feedback policy for that feedback, a wireless communications device skips remaining repetitive transmissions in that configured grant period and restarts transmissions in the next configured grant period . . . .

In some embodiments, the wireless communications device receives signalling for a new grant period during a repetition set time gap. In some embodiments, each repetition set applies a different repetition set time gap duration and/or repetition time gap configuration for the signalled new grant period.

In some embodiments, a repetition time gap between adjacent repetitive transmissions of a repetition set in the configured grant period is changed in accordance with a feedback policy for feedback received in the repetition set time gap following a repetition set in a previous configured grant period.

In some embodiments, a feedback policy for a repetition set in a first configured grant period is different from a feedback policy for a repetition set in another configured grant period. In some embodiments, the feedback policy for more than one configured grant period is signalled to the wireless communications device via at least one of: downlink control information, DCI, signalling; and radio resource control, RCC, signalling.

In some embodiments, a carrier contains a computer program comprising the one or more configuration parameters for use by the wireless communications device.

In some embodiments, the carrier containing the computer program is one of: an electric signal, and optical signal, a radio signal, or computer readable storage medium.

In some embodiments, the different redundancy version increases at least one of: a reception gain of the remaining K–X repetitions; and a reliability of the transmission of the remaining K–X repetitions. In some embodiments, the feedback policy determines if the wireless communications device resumes repetitions using an intra-repetition set time gap of duration dy which has a different duration as the duration dx of the previous intra-repetition set time gap. In other words, the feedback may result in a new grant configuration for bursts of repetitive transmissions which are differently spaced apart and which overrides the original signalled grant configuration for the spacing in the time-domain of the repetitive transmissions in that configured grant period.

In some embodiments, the feedback policy determines if the wireless communications device resumes transmitting repetitions using a different repetition occurrence configuration from the repetition occurrence configuration of the previous repetition set, in other words, previously a repetition set may have comprised 2 repetitive transmissions, with the next repetition set also comprising 2 repetitive transmission occasions. The feedback policy may dictate that if no feedback is received, for example, that more repetitions, say 3 repetitive transmissions are to form the next repetition set or burst.

In some embodiments, the feedback policy determines if, after a repetition set time gap, the wireless communications device resumes transmitting remaining repetitions using transmission occasions in a following grant period. In some embodiments, the transmission occasions in the following grant period are provided in the grant configuration for the configured grant period.

In some embodiments, the transmission occasions in the following grant period are provided in grant configuration signalling for the following grant period. In some embodiments, the transmission occasions in the following grant period are provided by dynamic grant signalling using different downlink control information to the downlink control information of the configured grant period. In some embodiments, the duration of a repetition set time gap is configured based on at least a processing time required by a gNB network node to process a transport block received from the wireless communications device and generate HARQ feedback for transmission to the wireless communications device.

In some embodiments, HARQ feedback is explicitly provided by the gNB network node to the wireless communications devices. In some embodiments, HARQ feedback is implicitly provided by the gNB network node to the wireless communications device. In some embodiments, the feedback policy is configurable to selectively enable or disable whether one type or more types of all HARQ feedback receivable by the wireless communications device during a time gap.

In some embodiments, the repetition time gap indicates a maximum duration for the wireless communications device to suspend transmitting repetitions for a transport block, and wherein during a repetition set time gap, if the wireless communications device receives feedback for that transport block the wireless communications device terminates the suspension of transmissions before the full duration of the time gap has expired.

In some embodiments, the wireless communications device receives signalling for a new grant configuration during each suspension period, so that each repetition set applies a different repetition set time gap and/or repetition time gap configuration in that grant period. In some embodiments, the repetition time gap duration dy between adjacent repetitions of the second repetition set in the configured grant period is changed in accordance with the feedback policy based on feedback received in the repetition set time gap duration dz following the first repetition set in the configured grant period.

In some embodiments, a feedback policy configuration for a first repetition set in a configured grant period is different from a feedback policy configuration for a second repetition set in the configured grant period. In some embodiments, a feedback policy configuration is signalled with feedback in a plurality of repetition set time gaps in a configured grant period as downlink control information, DCI, signalling or radio resource control, RCC, signalling.

The disclosed embodiments accordingly configure repetition occasions in the time-domain to allow a wireless communication device or UE 110 to spread and suspend when repetitive transmissions occur for one or more transport blocks (TBs). During the period of each inter-repetition set time gap dz, when the repetitive transmissions are suspended, the wireless communications device is able to wait and receive feedback for any suspended feedback processes. For example, in some embodiments, a UE can wait for a HARQ A/N during the configured inter-repetition set time gap(s) in each configured grant period. For example, depending on what feedback policy the wireless communications device is configured to apply to any feedback received during a configured grant period, in some embodiments, if ACK feedback is received, the remaining transmission occasions are skipped for that configuration period, if NACK feedback is received, the are resumed after that inter-repetition set time gap dz expires.

In one embodiment, a network node 120 configures a group of wireless communication device 110 such as, for example, a group of UEs with resources for a plurality of repetitive transmissions. At least the first repetition set of repetitive transmissions in each configured grant period is configured to use dedicated radio resources and/or repetitive transmission occasions. At least on other repetition set is configured in each configured grant period to use radio resources and transmission occasions which are shared amongst the wireless communication device UEs 110 in the group. The use of the shared second set of repetitions is controlled in these embodiments by the feedback each UE receives after transmitting on the first dedicated set of repetitions based on the feedback policy that that UE is configured to implement for the received feedback. In some examples of these embodiments, the feedback policy comprises one or more rules for the group of UEs. One example embodiment of such a group UE feedback policy provides rules which indicate that if a UE 110 in the group of UEs receives a NACK as feedback for a transport block or blocks which used the dedicated first set of repetitive transmission occasions, the transport block(s) are to be retransmit on the shared second set of shared resources. The same feedback policy can in some embodiments also include rules which indicate if the UE 110 in the group of UEs receives either a ACK feedback or no feedback/response for the first transmission on the dedicated first set of repetitions, the UE is not to transmit on any shared subsequent set(s) of repetitions. It will be apparent to anyone of ordinary skill in the art that in some of these embodiments there may be more than one repetition set which uses dedicated radio resources/occasions and/or more than one repetition set which uses shared radio resources/occasions.

In some embodiments, if a UE 110 in the group of UEs receives a NACK for the transport block(s) transmission(s) which used the dedicated first set of repetitions, the feedback policy may comprises one or more rules which indicate the UE is to retransmit the transport block(s) on a part of the shared second set of shared resources. Which part of the shared resources the UE uses for the retransmission may be pre-configured as part of the signalled grant allocation to that UE or established as part of the feedback to the UE provided in the intra-repetition set time gap which followed the first transmission on the dedicated first set of repetitions. In one embodiment, more than one UE 110 in the group of UEs could use different parts of the second set of repetitions which use shared resources for the transmission occasions. In this example embodiment, the feedback policy may include rules that establish for any UEs receiving either an ACK feedback or no feedback/response for the first transmission on the dedicated first set of repetitions that the UE is not to transmit on the shared second set of repetitions.

In some of the above embodiments where a network node 120 such as a gNB 120 allocates a configured grant of resources to a wireless communications device such as a UE 110, or collectively allocates as part of the configured grant shared resources with a group of UEs 110, the inter-repetition time gap duration dz between the K repetitions is configured at the same time as the configured redundancy version, RV, sequence. For example, a network node 120 can send a RV sequence to be used as {0,0,0,0} for a configured grant containing four repetition sets, where each repetition set is to use an RV sequence value 0. At the same time, the network node 120 is able to send a sequence of intra-repetition time gaps which follow each repetition set having durations such as {dz1,dz2,dz3,dz3}, meaning the inter-repetition set time gap of duration dz1 is to follow the first set of repetitions, and the inter-repetition set time gap of duration dz2 is to follow the second set of repetitions, and so on.

In some embodiments a computer program, comprising instructions which, when executed in any of the processing circuitry or apparatus embodiments disclosed as being configured or operated using computer program or computer code, causes apparatus or processing circuitry to carry one of the disclosed methods. In some embodiments, the computer code is configured as a plurality of modules. In some embodiments the apparatus or processing circuitry illustrated in FIGS. 2a, 2b, and 3 is configured to have the features illustrated in these figures using the computer code provided in the form of modules.

Some embodiments of the wireless communications device 110 disclosed comprise user equipment such as that shown in FIG. 2a which include a user interface. In some embodiments, however, the wireless communications device 110 does not include a user interface. The embodiments of the wireless communications device 110 disclosed herein are configured with suitable modules, components or other means to implement any of the disclosed methods 400 for the wireless communications device 110 to determine available radio resources for performing repetitive transmissions in a radio access network 100.

For example, in one embodiment, the wireless communications device 110 comprises means to implement an embodiment of method 400 which comprises at least a memory 210, a user interface 212, at least one processor or processing circuitry 200, an antenna 208 connected to an interface 206 via radio front end circuitry 204, the interface 206 being controllable via the processor or processing circuitry 200, and power circuitry 202, wherein the processor or processing circuitry 200 is configured to cause the wireless communications device 110 to implement an embodiment of the method 400 as disclosed herein. In some embodiments of the wireless communications device 110, computer code is stored in memory 210 which, when loaded from memory 210 for execution by the processor(s) or processing circuitry 200 cause the apparatus 110 to perform an embodiment of method 400.

Some embodiments of the network node 120, for example, a gNB 120, such as that shown in FIG. 2b or 3 of the accompanying drawings are configured with suitable modules, components or other means to implement an embodiment of the method 500 and/or the method 600 disclosed herein. For example, in some embodiments, the means to implement a method 500 or 500 and 600 as claimed comprise a memory 310, at least one processor or processing circuitry 300, an antenna 308 connected to an interface 306 via radio front end circuitry 304, wherein the interface is configured to be controlled by the at least one processor or processing circuitry 206, and power circuitry 302, wherein the processor or processing circuitry 200 is configured to cause the wireless communications device 110 to implement an embodiment of method 400. In some embodiments, the network node 120 further comprises computer code stored in memory 210 which, when loaded from memory 210 for execution by the processor(s) or processing circuitry 200 cause the network node 110 to perform an embodiment of method 500 or 500 and 600.

Some embodiments of the disclosed technology comprise a communication system including a host computer comprising: processing circuitry configured to provide user data; and a communication interface configured to forward the user data to cellular or radio access network for transmission to a user equipment, UE, comprising a wireless communications device 110 configured to perform one of the disclosed embodiments of method 400, wherein the radio access or cellular network comprises at least one network node 120 having a radio interface and processing circuitry, wherein the processing circuitry is configured to perform one of the disclosed embodiments of methods 500 or 600 that complement the method 400 performed by the wireless communications device.

Some embodiments of the disclosed technology comprise a communication system including a radio access network 100, at least one network node 120, and at least one wireless communications device 110, wherein the at least one network node 120 is configured perform any of the disclosed embodiments of method 500 or 600 to allocate a configured grant of radio resources to to at least one wireless communications device 110 comprising user equipment configured to implement any one of the disclosed embodiments of method 400.

Some embodiments of the disclosed technology comprise a carrier comprising signalling from a disclosed embodiment of a network node 120 to at least one wireless communications device 110 comprising user equipment, according to any of the disclosed embodiments. For example, the carrier may carry the signalling over a radio access network 100 of any of the disclosed communications systems. The carried signalling may include information indicating a plurality of parameters for a configured grant of radio resources for a plurality of repetitive transmissions. In some embodiments, the carrier contains a computer program comprising the one or more configuration parameters for use by the wireless communications device. In some embodiments, the carrier containing the computer program is one of: an electric signal, and optical signal, a radio signal, or computer readable storage medium.

Some embodiments of the disclosed technology comprise a computer readable storage medium comprising computer code, which when loaded and executed by one or more processors or processing circuitry of a wireless communications device 110, causes the wireless communications device to perform one of the disclosed embodiments of method 400 or the first aspect.

Some embodiments of the disclosed technology comprise a computer readable storage medium comprising computer code, which when loaded and executed by one or more processors or processing circuitry of a network node 120, causes the network node 120 to perform a method 500 or 600 or according to any of the second aspects.

Other Aspects

A fifth aspect of the disclosed embodiments comprises a user equipment (UE) for sending repetitive transmissions in a radio access network, the UE comprising: an antenna configured to send and receive wireless signals; radio front-end circuitry connected to the antenna and to processing circuitry, and configured to condition signals communicated between the antenna and the processing circuitry; the processing circuitry being configured to receive 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and, use 406, for at least one transport block, the signalled at least one configuration of radio resources for repetitively transmitting the at least one transport block in the at least one configured grant period; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE. In some embodiments of the UE, the processing circuitry is further configured to perform any one of the other embodiments of method 400 also disclosed in the description as the first aspect and/or in the accompanying claims as being performed by the wireless communications device 100, for example, the wireless device of the third aspect.

A sixth aspect of the disclosed embodiments comprises a communication system including a host computer comprising: processing circuitry configured to provide user data; and a communication interface configured to forward the user data to a radio access network for transmission to a user equipment (UE), wherein the radio access network comprises a network node configured to provide base station functionality, the network node having a radio interface and processing circuitry, the network node's processing circuitry configured to obtain, for example, by generating or by receiving, signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and send the signalling information to at least one of the plurality of wireless communication devices. In some embodiments of the communication system, the processing circuitry is further configured to perform any one of the other embodiments of method 500 disclosed in the description and/or in the accompanying claims as being performed by the network node 120, for example, a method according to an embodiment of the second aspect disclosed herein. In some embodiments, the communication system further includes the network node and/or the UE and the UE is configured to communicate with the network node. In some embodiments of the communication system of the seventh aspect, the processing circuitry of the host computer is configured to execute a host application, thereby providing the user data; and the UE comprises processing circuitry configured to execute a client application associated with the host application.

A seventh aspect of the disclosed embodiments comprises a method implemented in a communication system including a host computer, a network node, for example a network node providing base station functionality, and a user equipment, UE, the method comprising: at the host computer, providing user data; and at the host computer, initiating a transmission carrying the user data to the UE via a cellular network, for example, a radio access network 100, comprising the network node, wherein the network node is configured to grant radio resources to a plurality of wireless communications devices 110 and is configured to obtain signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to send the signalling information to at least one of the plurality of wireless communication devices, for example, as disclosed herein according to one of embodiments of the third aspect. In some embodiments, the obtaining comprises generating the signalling information. In some embodiments, the obtaining comprises receiving the signalling information. In some embodiments, the signalling indicates at least one configuration of radio resources for a plurality of repetition sets comprising the time-domain repetitive transmissions in at least one configured grant period, and wherein the other time-gap between the repetitive transmissions comprises an intra-repetition set time gap with a duration dx between repetitive transmissions of a repetition set. In some embodiments, the at least one time-gap comprises an inter-repetition set time gap of duration dz which follows at least the first repetition set of the at least one configured grant period. In some embodiments, the signalling includes a feedback policy for any feedback which is received by the at least one wireless communications device (110) in an inter-repetition set time gap duration dz. In some embodiments of the method implemented in the communications system, the method further comprises the network node performing any one of the other embodiments of method (500) disclosed in the description and/or in the accompanying claims as being performed by the network node (120). In some embodiments, the method further comprises, at the network node, transmitting the user data. In some embodiments, the user data is provided at the host computer by executing a host application, and wherein the method further comprises, at the UE, executing a client application associated with the host application.

An eighth aspect of the disclosed technology comprises a user equipment (UE), for example, as disclosed herein according to the fifth aspect, being configured to communicate with a network node 120, such as a network node providing base station functionality, or a base station. The UE comprises a radio interface and processing circuitry and is configured to perform any one of the embodiments of the method of the seventh aspect.

An ninth aspect of the disclosed embodiments comprises a communication system including a host computer comprising: processing circuitry configured to provide user data; and a communication interface configured to forward user data to a cellular network, for example, a radio access network, for transmission to a UE, wherein the UE comprises a radio interface and processing circuitry, the UE's components configured to receive 402 signalling allocating at least one configuration of radio resources for a plurality of time-domain repetitive transmissions in at least one config-ured grant period, wherein each configured grant period is configured to provide at least one time-gap of a longer duration than another time-gap between the repetitive trans-missions in that configured grant period and to use 406, for at least one transport block, the signalled at least one configuration of radio resources for repetitively transmitting the at least one transport block in the at least one configured grant period. In some embodiments of the UE, the process-ing circuitry is further configured to perform any one of the other embodiments of method 400 as disclosed in the description and/or according to an embodiment of the first aspect. In some embodiments of the communication system of the eighth aspect, the cellular network further includes a network node 120 according to the fourth aspect or accord-ing to any of the other embodiments, which is configured to communicate with the UE. In some embodiments of the communication system, the processing circuitry of the host computer is configured to execute a host application, thereby providing the user data; and the UE's processing circuitry is configured to execute a client application associated with the host application.

An tenth aspect of the disclosed embodiments comprises a method implemented in a communication system includ-ing a host computer, a network node 120 configured to provide base station functionality and a UE the method comprising: at the host computer, providing user data; and at the host computer, initiating a transmission carrying the user data to the UE via a radio network comprising the network node, wherein the UE is configured to receive 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to use 406, for at least one transport block, the signalled at least one configuration of radio resources for repetitively transmitting the at least one transport block in the at least one configured grant period. In some embodiments of the method, the method further comprises performing any one of the other embodiments of method 400 or as disclosed in the descrip-tion and/or according to an embodiment of the first aspect as being performed by the wireless communications device 100. In some embodiments of the above method aspect, the method further comprises at the UE, receiving the user data from the base station.

An eleventh aspect of the disclosed embodiments com-prises a communication system including a host computer comprising: communication interface configured to receive user data originating from a transmission from a UE to a network node configured to provide base station function-ality, wherein the UE comprises a radio interface and processing circuitry, the UE's processing circuitry being configured to receive 402 signalling allocating at least one configuration of radio resources for a plurality of time-domain repetitive transmissions in at least one configured grant period, wherein each configured grant period is con-figured to provide at least one time-gap of a longer duration than another time-gap between the repetitive transmissions in that configured grant period and to use 406, for at least one transport block, the signalled at least one configuration of radio resources for repetitively transmitting the at least one transport block in the at least one configured grant period. In some embodiments of the UE, the processing circuitry is further configured to perform any one of the other embodiments of method 400 disclosed in the descrip-tion and/or according to the first method aspect. Some embodiments of the above communication system further include the UE. Some embodiments of the above commu-nication system further include the network node 110 con-figured to provide base station functionality, wherein the network node comprises a radio interface configured to communicate with the UE and a communication interface configured to forward to the host computer the user data carried by a transmission from the UE to the base station. In some embodiments of the above communication system aspect, the processing circuitry of the host computer is configured to execute a host application and the UE's processing circuitry is configured to execute a client appli-cation associated with the host application, thereby provid-ing the user data. In some embodiments of the communi-cation system of the above aspect, the processing circuitry of the host computer is configured to execute a host applica-tion, thereby providing request data and the UE's processing circuitry is configured to execute a client application asso-ciated with the host application, thereby providing the user data in response to the request data.

A twelfth aspect of the disclosed embodiments comprises a method implemented in a communication system includ-ing a host computer, a network node configured to provide base station and a user equipment (UE), the method com-prising: at the host computer, receiving user data transmitted to the network node from the UE, wherein the UE is configured to receive 402 signalling allocating at least one configuration of radio resources for a plurality of time-domain repetitive transmissions in at least one configured grant period, wherein each configured grant period is con-figured to provide at least one time-gap of a longer duration than another time-gap between the repetitive transmissions in that configured grant period and to use 406 for at least one transport block, the signalled at least one configuration of radio resources for repetitively transmitting the at least one transport block in the at least one configured grant period. In some embodiments, the received signalling indicates at least one configuration of radio resources for a plurality of repetition sets comprising the time-domain repetitive trans-missions in at least one configured grant period, and wherein the other time-gap between the repetitive transmissions comprises an intra-repetition set time gap with a duration dx between repetitive transmissions of a repetition set. In some embodiments, the at least one time-gap comprises an inter-repetition set time gap of duration dz which follows at least the first repetition set of the at least one configured grant period. In some embodiments, US is configured to use the signalling information by initiating 408 in a configured grant period of the at least one configured grant periods, the repetitive transmissions of the at least one transport block using the at least one configuration of radio resources, and suspending 410, following transmitting the repetitive transmissions of a repetition set, subsequent transmissions for up to a duration dz of the intra-repetition set gap configured to follow that repetition set.

In some embodiments of the method of the twelfth aspect, the method further comprises any one of the other embodiments of method 400 disclosed in the description and/or according to the first aspect. The method may further comprise: at the UE, providing the user data to the base station. The method may further comprise: at the UE, executing a client application, thereby providing the user data to be transmitted; and at the host computer, executing a host application associated with the client application. The method may further comprise: at the UE, executing a client application; and at the UE, receiving input data to the client application, the input data being provided at the host computer by executing a host application associated with the client application, wherein the user data to be transmitted is provided by the client application in response to the input data.

A thirteenth aspect of the disclosed embodiments comprises a communication system including a host computer comprising a communication interface configured to receive user data originating from a transmission from a user equipment (UE) to a network node, for example, a network node providing base station functionality or a base station, wherein the network node comprises a radio interface and processing circuitry, the network node's processing circuitry being configured to obtain signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and to send the obtained signalling information to at least one of the plurality of wireless communication devices. In some embodiments, the obtaining comprises generating the signalling information. In some embodiments, the obtaining comprises receiving the signalling information. In some embodiments of the communication system, the processing circuitry is further configured to perform any one of the other embodiments of method (500) disclosed in the description and/or in the accompanying claims as being performed by the network node (120). In some embodiments of the above communication system aspect, the communication system further includes the network node and/or further includes the UE, wherein the UE is configured to communicate with the network node. In some embodiments of the above communication system, the processing circuitry of the host computer is configured to execute a host application and the UE is configured to execute a client application associated with the host application, thereby providing the user data to be received by the host computer.

A fourteenth aspect of the disclosed embodiments comprises a method implemented in a communication system including a host computer, a network node, for example a network node configured to provide base station functionality or a base station, and a user equipment (UE), the method comprising: at the host computer, receiving, from the network node, user data originating from a transmission which the network node has received from the UE, wherein the UE is configured to receive 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to use 406, for at least one transport block, the signalled at least one configuration of radio resources for repetitively transmitting the at least one transport block in the at least one configured grant period. In some embodiments of the UE, the processing circuitry is further configured to perform any one of the other embodiments of method 400 disclosed in the description and/or according to any one of the embodiments of a method according to the first aspect. In some embodiments of the above method aspect, the method further comprises at the network node, receiving the user data from the UE. In some embodiments, the method further comprises, at the network node, initiating a transmission of the received user data to the host computer.

A fifteenth aspect of the disclosed technology comprises a computer readable storage medium comprising computer code, which when loaded and executed by one or more processors or processing circuitry of a wireless communications device 110, causes or configures the wireless communications device to receive 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and to use 406 for at least one transport block, the signalled at least one configuration of radio resources for repetitively transmitting the at least one transport block in the at least one configured grant period. In some embodiments of the method, the method further comprises performing any one of the other embodiments of method 400 disclosed in the description and/or according to any one of the embodiments of the first method aspect.

An sixteenth aspect of the disclosed technology comprises a computer readable storage medium comprising computer code, which when loaded and executed by one or more processors or processing circuitry of a network node 120, causes the network node 120 obtain, for example by generating or by receiving, signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period, and send the signalling information to at least one of the plurality of wireless communication devices. In some embodiments of the sixteenth aspect, the computer code further causes or configures the network node 120 to perform any one of the other embodiments of method 500 disclosed in the description and/or according to any one of the embodiments of the second method aspect.

A seventeenth aspect of the disclosed technology comprises an apparatus or control circuitry 1900 for performing repetitive transmissions in a radio access network 100, the apparatus or control circuitry comprising: means or a module for receiving 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and means or a module for using 406, for at least one transport block, the signalled at least one configuration of radio resources for repetitively transmitting the at least one transport block in the at least one configured grant period. In some embodiments of the above apparatus or control circuitry aspect, the apparatus or control circuitry further comprise one or more means or modules to perform any one of the other embodiments of method 500 disclosed in the description and/or according to any of the disclosed embodiments of the method of the second aspect. FIG. 9a illustrates schematically an embodiment of the apparatus or control circuitry of the seventeenth aspect. In FIG. 9a, the apparatus or control circuitry is illustrated as apparatus 1900, comprising an input/output data interface module 1902, memory 1906 and one or more processors or processing circuitry 1904. The memory 1906 is configured to hold computer program code which, when loaded by the processors or processing circuitry 1904 comprises one or more means or modules to cause the apparatus to implement any one of the disclosed embodiments of method 400. For example, as illustrated in FIG. 9a, executing by the one or more processors of the computer program code provides means or a module 1908 for receiving 402 signalling allocating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and means or a module 1910 for using 406, for at least one transport block, the signalled at least one configuration of radio resources for repetitively transmitting the at least one transport block in the at least one configured grant period.

An eighteenth aspect of the disclosed technology comprises an apparatus or control circuitry 1900 configured to grant radio resources to a plurality of wireless communications devices 110 comprising means or one or more modules to obtain, for example, by generating or by receiving, signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period and means or one or more modules to send the signalling information to at least one of the plurality of wireless communication devices. In some embodiments of the eighteenth aspect, the apparatus or control circuitry further comprise one or more means or modules to perform any one of the other embodiments of method 500 disclosed in the description and/or according to any one of the disclosed embodiments of the second aspect.

A nineteenth aspect of the disclosed technology comprises a carrier signal comprising signalling from a network node according to any of the embodiments of the fourth aspect to at least one wireless communications device comprising user equipment, UE, according to any one of the embodiments of the fifth or eighth aspects, wherein the signalling comprises information indicating a plurality of parameters for a configured grant of radio resources for a plurality of repetitive transmissions.

The disclosed aspects and embodiments may be combined with each other in any suitable manner which would be apparent to someone of ordinary skill in the art.

FIG. 9b illustrates schematically an embodiment of the apparatus or control circuitry of the thirteenth aspect. In FIG. 9B, the apparatus or control circuitry is illustrated as apparatus 2000, comprising an input/output data interface module 2002, memory 2006 and one or more processors or processing circuitry 2004. The memory 2006 is configured to hold computer program code which, when loaded by the processors or processing circuitry 2004 comprises one or more means or modules to cause the apparatus to implement any one of the disclosed embodiments of method 500. For example, as illustrated in FIG. 9B, executing by the one or more processors of the computer program code provides a means such as module 2008 for obtaining signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period to at least one of the plurality of wireless communications devices 110 over the radio access network and a means such as module 2010 for sending the signing information to one or more wireless communications devices 110.

Figure 10:
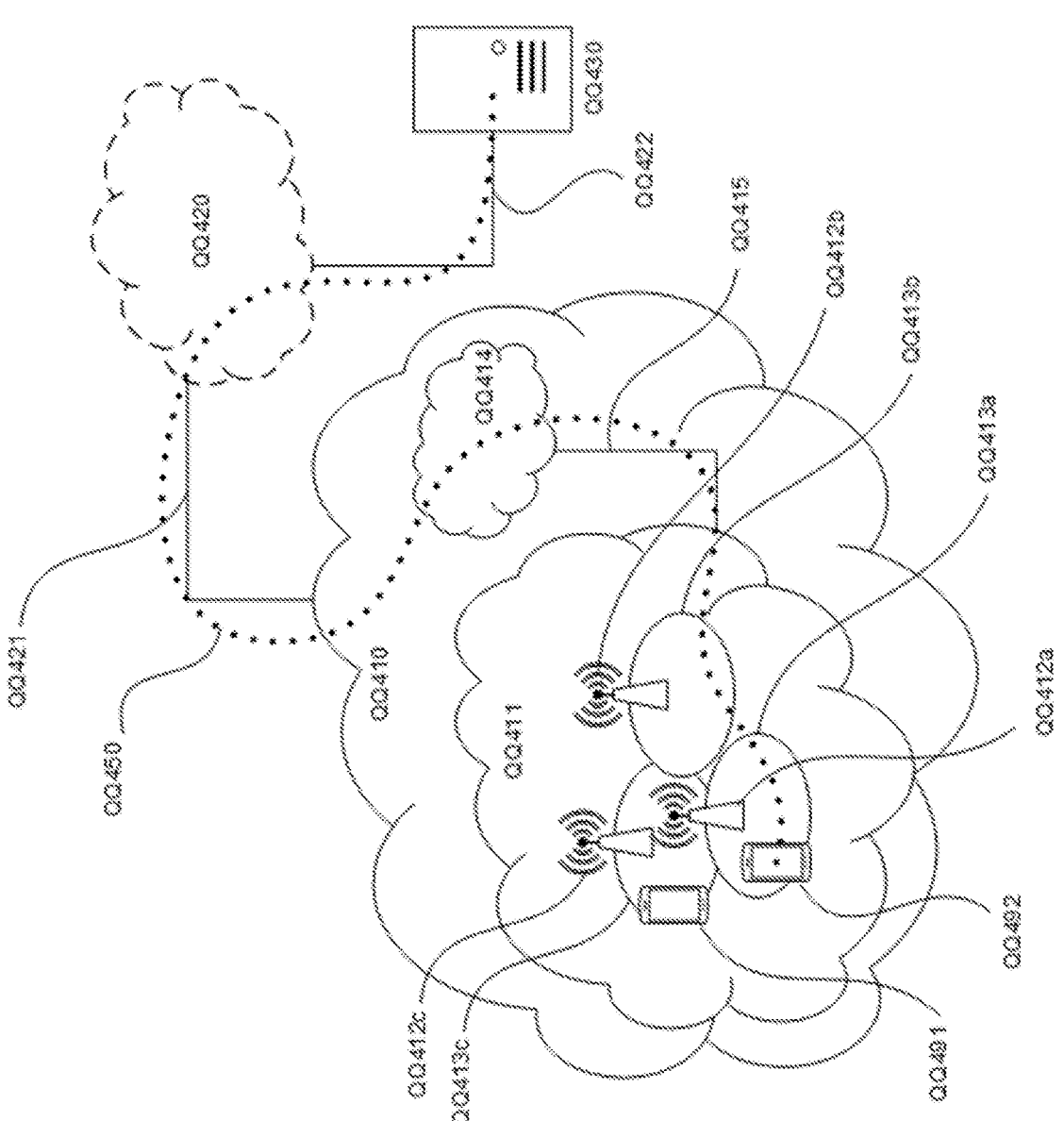
FIG. 10 schematically illustrates a telecommunication network connected via an intermediate network to a host computer.

With reference to FIG. 10, in accordance with an embodiment, a communication system includes a communication or telecommunication network QQ410, such as a 3GPP-type cellular network, which comprises access network QQ411, such as a radio access network, and core network QQ414. Access network QQ411 comprises a plurality of network nodes, for example, network nodes providing base station functionality or base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
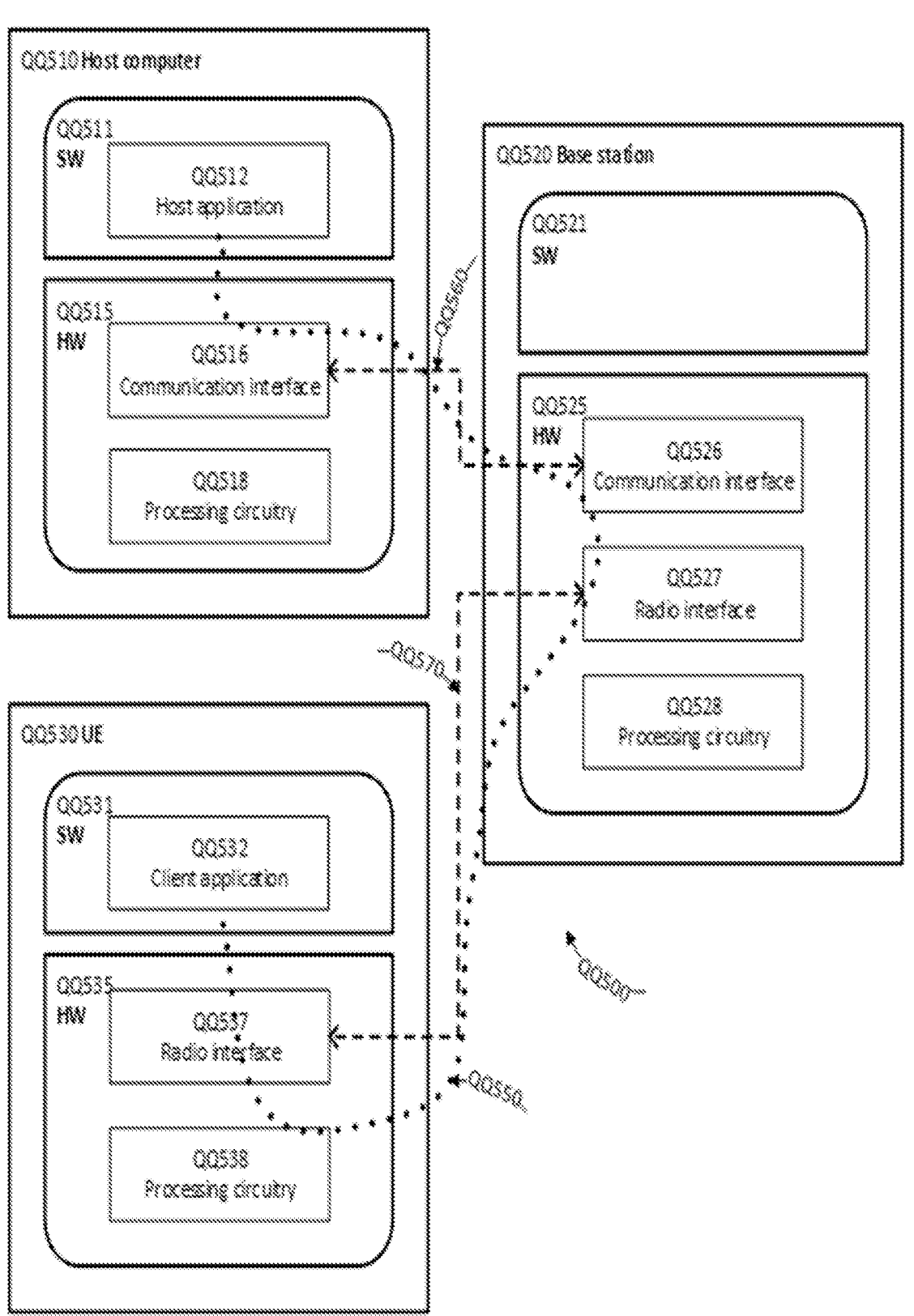
FIG. 11 is a generalized block diagram of a host computer communicating via a base station with a user equipment over a partially wireless connection.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 11.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may reduce the latency and thereby provide benefits such as reduced user waiting time and/or better responsiveness. For example, the embodiments of the disclosed technology disperse repetitions throughout each configured grant period, thereby allowing feedback to be provided during the repetitive transmission, which allows in some embodiments, one or more of the inter and/or intra repetition set timing-gaps to be adjusted and other features to be implemented based on a feedback policy for that configured grant periods. By not having to wait until the next configure grant period for feedback, the latency of transmissions can be improved within the cellular network.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 12A, 12B:
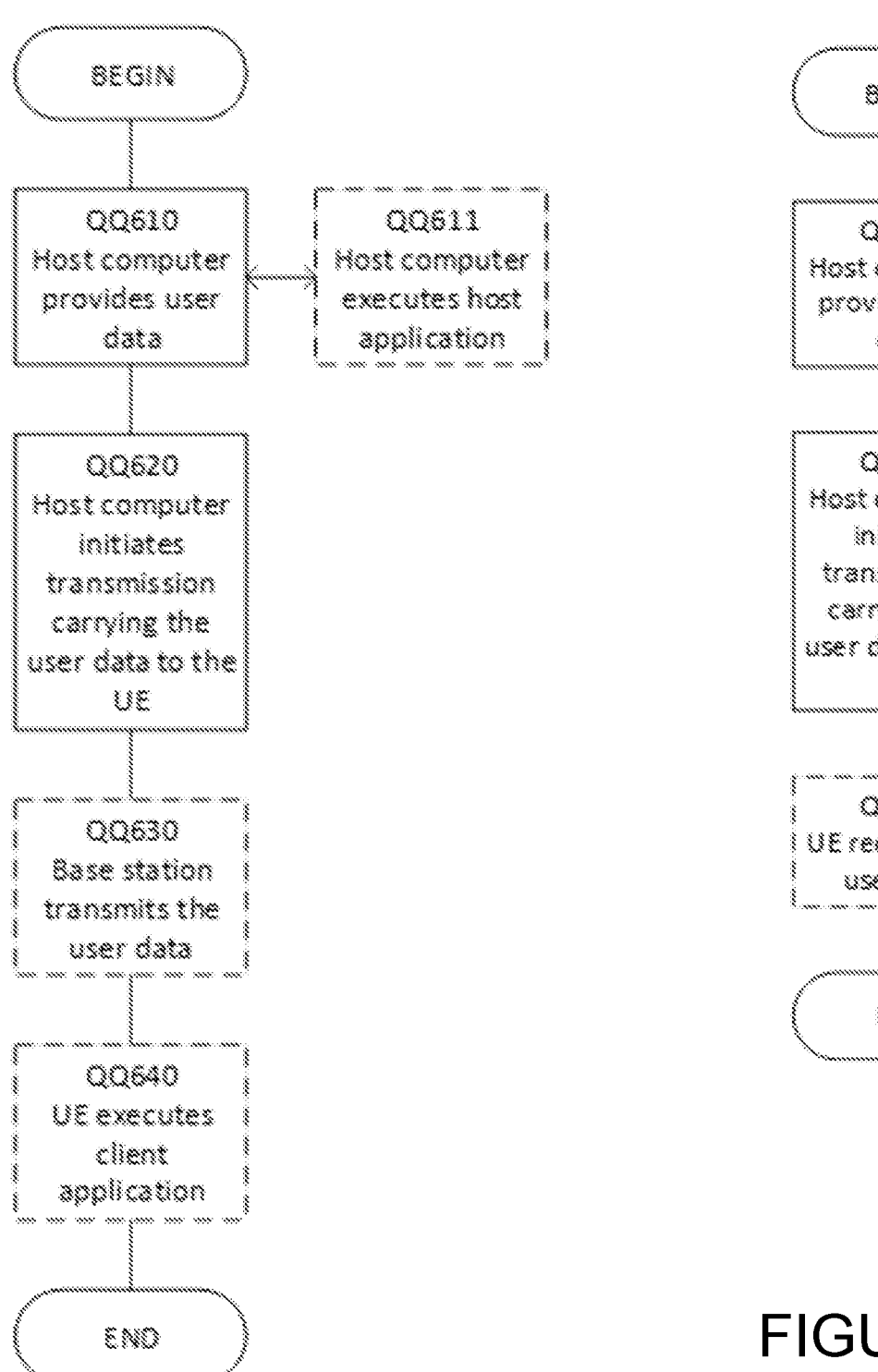
FIGS. 12a, 12b, 13a and 13b are flowcharts illustrating methods implemented in a communication system including a host computer, a base station and a user equipment, according to the some of the disclosed embodiments

FIG. 12a is a flowchart illustrating a method implemented in a communication system, in accordance with one embodiment. The communication system includes a host computer, a network node such as, for example, a network node providing base station functionality or a base station and a UE. The network node may comprise, for example, any of the disclosed embodiments of network node 120, QQ520 or QQ412a disclosed herein with reference to FIG. 1, 2b, 3, 10 or 11. The UE may comprise, for example, any of the disclosed examples of UE QQ491, QQ492, QQ530 or the wireless communications device 110 disclosed herein, such as those described with reference to FIG. 1, 2a, 10 or 11. For simplicity of the present disclosure, only drawing references to FIG. 12a will be included in this section. QQ610, the host computer provides user data. In substep QQ611 (which may be optional) of step QQ610, the host computer provides the user data by executing a host application. QQ620, the host computer initiates a transmission carrying the user data to the UE. QQ630 (which may be optional), the base station transmits to the UE the user data which was carried in the transmission that the host computer initiated, in accordance with the teachings of the embodiments described throughout this disclosure. QQ640 (which may also be optional), the UE executes a client application associated with the host application executed by the host computer.

FIG. 12b is a flowchart illustrating a method implemented in a communication system, in accordance with one embodiment. The communication system includes a host computer, a network node 120, for example, a network node providing base station functionality or a base station and a UE. The network node may comprise, for example, any of the disclosed embodiments of network node 120, QQ520 or QQ412a disclosed herein with reference to FIG. 1, 2b, 3, 10 or 11. The UE may comprise, for example, any of the disclosed examples of UE QQ491, QQ492, QQ530 or the wireless communications device 110 disclosed herein, such as those described with reference to FIG. 1, 2a, 10 or 11. For simplicity of the present disclosure, only drawing references to FIG. 16 will be included in this section. QQ710 of the method, the host computer provides user data. In an optional substep (not shown) the host computer provides the user data by executing a host application. QQ720, the host computer initiates a transmission carrying the user data to the UE. The transmission may pass via the base station, in accordance with the teachings of the embodiments described throughout this disclosure. QQ730 (which may be optional), the UE receives the user data carried in the transmission.

Figures 13A, 13B:
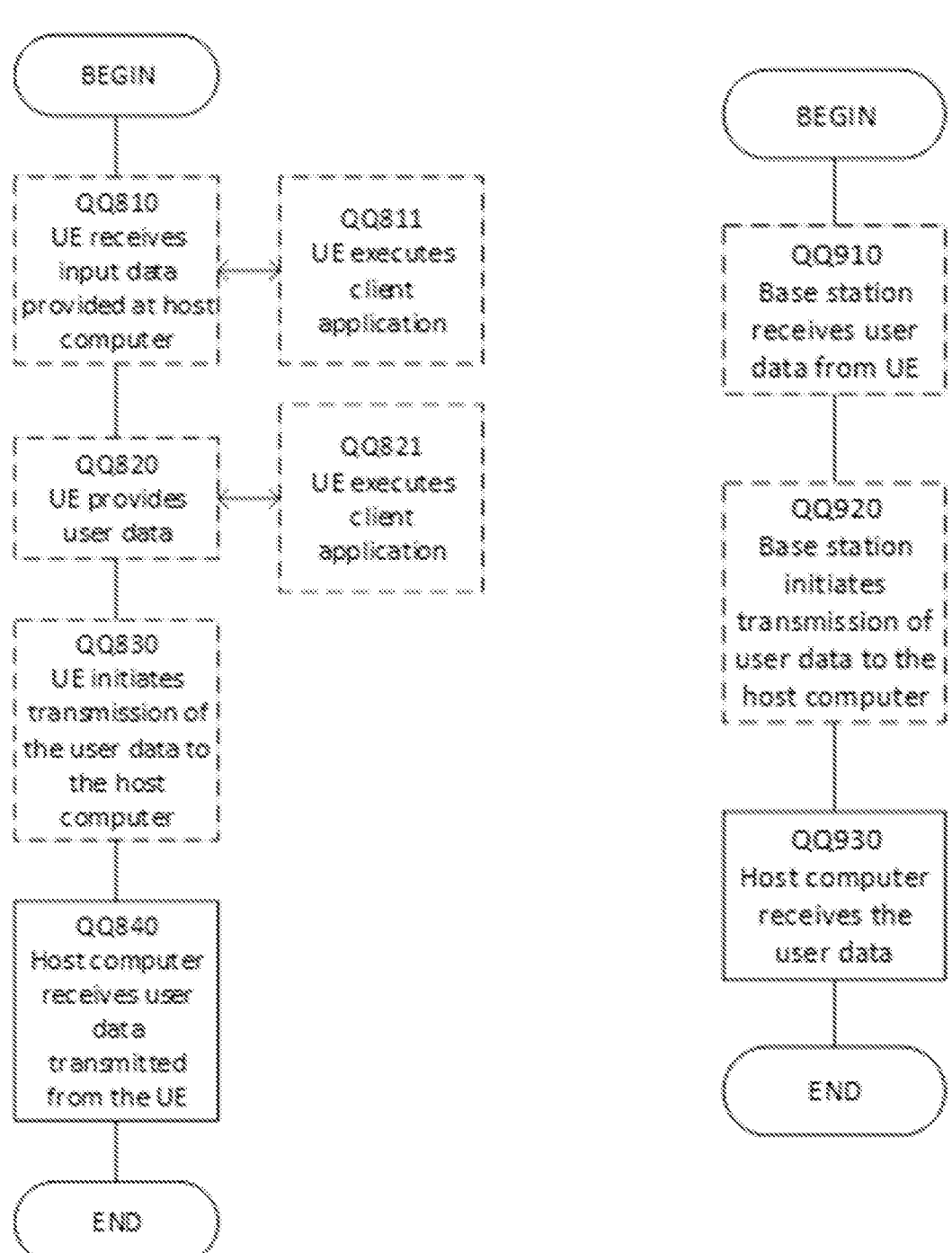

FIG. 13a is a flowchart illustrating a method implemented in a communication system, in accordance with one embodiment. The communication system includes a host computer, a network node 120, for example, a network node providing base station functionality or a base station and a UE. The network node may comprise, for example, any of the disclosed embodiments of network node 120, QQ520 or QQ412a disclosed herein with reference to FIG. 1, 2b, 3, 10 or 11. The UE may comprise, for example, any of the disclosed examples of UE QQ491, QQ492, QQ530 or the wireless communications device 110 disclosed herein, such as those described with reference to FIG. 1, 2a, 10 or 11. For simplicity of the present disclosure, only drawing references to FIG. 19 will be included in this section. QQ810 (which may be optional), the UE receives input data provided by the host computer. Additionally or alternatively, QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. QQ840 of the method, the host computer receives the user data transmitted from the UE, in accordance with the teachings of the embodiments described throughout this disclosure.

FIG. 13b is a flowchart illustrating a method implemented in a communication system, in accordance with one embodiment. The communication system includes a host computer, a network node 120, for example, a network node providing base station functionality or a base station and a UE. The network node may comprise, for example, any of the disclosed embodiments of network node 120, QQ520 or QQ412a disclosed herein with reference to FIG. 1, 2b, 3, 10 or 11. The UE may comprise, for example, any of the disclosed examples of UE QQ491, QQ492, QQ530 or the wireless communications device 110 disclosed herein, such as those described with reference to FIG. 1, 2a, 10 or 11. For simplicity of the present disclosure, only drawing references to FIG. 20 will be included in this section. QQ910 (which may be optional), in accordance with the teachings of the embodiments described throughout this disclosure, the base station receives user data from the UE. QQ920 (which may be optional), the base station initiates transmission of the received user data to the host computer. QQ930 (which may be optional), the host computer receives the user data carried in the transmission initiated by the base station.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although some terminology from 3GPP LTE, 5G and 6G standards related technology has been used herein to explain the example embodiments, this should not be seen as limiting the scope of the example embodiments to only these aforementioned communication systems. Other wireless systems may also benefit from the example embodiments disclosed herein.

Also note that terminology such as eNodeB and wireless communications device should be considered as non-limiting and does in particular not imply a certain hierarchical relation between the two. In general "eNodeB" could be considered as device 1 and "wireless communications device" as device 2, and these two devices communicate with each other over some radio channel. Furthermore, while the example embodiments focus on wireless transmissions in the uplink, it should be appreciated that the example embodiments could be applicable in the downlink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

A "wireless communications device" as the term may be used herein, is to be broadly interpreted to include a radio-telephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radio-telephone or wireless communication system; a laptop; a camera (e.g., video and/or still image camera) having communication ability; and any other computation or communication device capable of transcribing, such as a personal computer, a home entertainment system, a television, etc. Furthermore, a device may be interpreted as any number of antennas or antenna elements.

Where the description refers to "user equipment" this is to be considered a non-limiting term which means any wireless communications device, terminal, or node capable of receiving in DL and transmitting in UL (e.g. PDA, laptop, mobile, sensor, fixed relay, mobile relay or even a radio base station, e.g. femto base station), which may or may not be always used or useable by a human user, for example UE may be used by a machine user in some embodiments.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed by a wireless communications device for sending repetitive transmissions in a radio access network, the method comprising:

receiving signalling indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and using, for at least one transport block, the signalled at least one configuration of radio resources for repetitively transmitting the at least one transport block in the at least one configured grant period, wherein the signalling indicates at least one configuration of radio resources for a plurality of repetition sets comprising the time-domain repetitive transmissions in at least one configured grant period.

2. The method of claim 1, wherein the other time-gap between the repetitive transmissions comprises an intra-repetition set time gap with a duration dx between repetitive transmissions of a repetition set.

3. The method of claim 2, wherein the at least one time-gap comprises an inter-repetition set time gap of duration (dz) which follows at least the first repetition set of the at least one configured grant period.

4. The method of claim 3, wherein the using comprises:

initiating, in a configured grant period of the at least one configured grant period, the repetitive transmissions of the at least one transport block using the at least one configuration of radio resources; and suspending following transmitting the repetitive transmissions of the repetition set, subsequent transmissions for up to a duration (dz) of the intra-repetition set gap configured to follow that repetition set.

5. The method of claim 3, wherein the signalled configured duration (dz) of each inter-repetition set time gap following a repetition set varies within each of the at least one configured grant period.

6. The method of claim 3, wherein, another intra-repetition set time gap of duration (dy) is configured between adjacent repetitions of at least one other repetition set in the at least one configured grant period, and wherein the duration dy of the intra-repetition set time gap, is different from the duration dx of a previous intra-repetition set time gap.

7. The method of claim 1, wherein the received signalling further configures one or more or all of the following configuration parameters for the radio resources for each of the at least one configured grant period:

a number of transport blocks or feedback processes which can be suspended in that configured grant period;

a maximum number of inter-repetition set time gaps (dz) during which the repetitive transmissions of each transport block or feedback process in that configured grant period are suspended;

a maximum number of repetitions (K) in a repetition set; and a redundancy version (RV) sequence for each repetition set in that configured grant period.

8. The method of claim 3, wherein the signalled configuration of radio resources is signalled to at least one other wireless communications device which with the wireless communications device form a group of wireless communications devices, wherein the signalling indicates dedicated radio resources for at least one repetition set for use by each wireless communications device of the group and shared radio resources for at least one other repetition set for shared use by the wireless communication devices of the group.

9. The method of claim 3, further comprising:

detecting, by the wireless communications device, feedback received during an inter-repetition set time gap in one of the at least one configured grant period; and based on the detected feedback, resuming or skipping one or more remaining repetition sets using the allocated resources for that configured grant period in accordance with a feedback policy.

10. The method of claim 9, wherein, the feedback policy determines one or more characteristics of one or more subsequent repetition sets in at least that configured grant period depending on the detected feedback meeting one or more feedback conditions.

11. The method of claim 9, wherein the feedback policy includes a feedback condition which must be met by feedback received by the wireless communications device if the wireless communications devices is to resume repetitive transmissions in another repetition set of that configured grant period or of a different configured grant period.

12. The method of claim 9, wherein the feedback policy determines at least one of:

an intra-repetition set time gap of duration (dy) between adjacent repetitive transmissions of a repetition set in the same or a different configured grant period of which follows the received feedback, where the duration (dy) of the intra-repetition set time gap is different from a previous duration dx of the intra-repetition set time gap; and a subsequent inter-repetition set time gap duration (dz2) between adjacent sets of repetitive transmissions in the same or a different configured grant period which follows the received feedback, where the duration dz2 is different from a previous duration dz of the inter-repetition set time gap.

13. The method of claim 9, wherein different feedback policies are configured for different repetition sets in at least one configured grant period.

14. A method performed by a network node in a radio access network, the network node being configured to grant radio resources to a plurality of wireless communications devices, the method comprising:

obtaining signalling information indicating at least one configuration of radio resources for a plurality of time-domain repetitive transmissions in at least one configured grant period, wherein each configured grant period is configured to provide at least one time-gap of a longer duration than another time-gap between the repetitive transmissions in that configured grant period; and sending the signalling information to at least one of the plurality of wireless communication devices, wherein the signalling information indicates at least one configuration of radio resources for a plurality of repetition sets comprising the time-domain repetitive transmissions in at least one configured grant period.

15. The method of claim 14, wherein the other time-gap between the repetitive transmissions comprises an intra-repetition set time gap with a duration dx between repetitive transmissions of a repetition set.

16. The method of claim 15, wherein the at least one time-gap comprises an inter-repetition set time gap of duration dz which follows at least the first repetition set of the at least one configured grant period.

17. The method of claim 16, wherein the signalling includes a feedback policy for any feedback which is received by the at least one wireless communications device in an inter-repetition set time gap dz.

18. The method of claim 14, wherein the signalling includes at least one configuration of radio resources comprising a intra-repetition set time gap with a different duration dy between repetitive transmissions in at least one other repetition set in the configured grant period.

19. The method of claim 14, wherein the signalling further includes one or more of the following grant configuration parameters:

a number of transport blocks or feedback processes for which repetitive transmissions can be suspended in a configured grant period;

a maximum number of time gaps, each with duration dz, during which repetitive transmissions of each transport block or feedback process are suspended in a configured grant period;

a maximum number of repetitive transmissions (K) for a configured grant period; and a redundancy version (RV) sequence for each repetition set in a configured grant period.

20. The method of claim 14, wherein the signalling comprises at least one of the following:

system information signalling;

dedicated radio resource control (RRC) signalling;

media access control (MAC) control element (CE) signalling; and downlink control information (DCI) signalling.

\* \* \* \* \*